(12) United States Patent
Hammond et al.

(10) Patent No.: US 9,059,444 B2
(45) Date of Patent: Jun. 16, 2015

(54) HIGHLY CONDUCTING SOLID STATE IONICS FOR ELECTROCHEMICAL SYSTEMS AND METHODS OF FABRICATING THEM USING LAYER-BY LAYER TECHNOLOGY

(75) Inventors: Paula T. Hammond, Newton, MA (US); Avni A. Argun, Newton, MA (US); J. Nathan Ashcraft, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1303 days.

(21) Appl. No.: 12/364,138

(22) Filed: Feb. 2, 2009

(65) Prior Publication Data

US 2009/0197138 A1 Aug. 6, 2009

Related U.S. Application Data

(60) Provisional application No. 61/025,096, filed on Jan. 31, 2008.

(51) Int. Cl.
| | |
|---|---|
| H01M 10/056 | (2010.01) |
| H01M 8/10 | (2006.01) |
| C08J 5/22 | (2006.01) |
| H01M 8/04 | (2006.01) |

(52) U.S. Cl.
CPC ............ *H01M 8/1011* (2013.01); *C08J 5/2275* (2013.01); *H01M 8/04261* (2013.01); *H01M 8/1023* (2013.01); *H01M 8/1025* (2013.01); *H01M 8/1027* (2013.01); *H01M 8/103* (2013.01); *H01M 8/1032* (2013.01); *H01M 8/1039* (2013.01); *H01M 8/1053* (2013.01); *H01M 8/106* (2013.01); *H01M 8/1081* (2013.01); *H01M 8/1093* (2013.01); *H01M 2300/0082* (2013.01); *H01M 2300/0094* (2013.01); *Y02E 60/523* (2013.01)

(58) Field of Classification Search
CPC . H01M 8/1053; H01M 8/1027; H01M 8/103; H01M 8/1032; H01M 8/1256; H01M 2008/1095; H01M 2300/0094; H01M 6/181; H01M 10/056
USPC ..................... 429/33, 491, 494, 188, 304, 314
See application file for complete search history.

(56) References Cited

U.S. PATENT DOCUMENTS

| | | | | |
|---|---|---|---|---|
| 5,910,366 | A * | 6/1999 | Chowdhury et al. | 428/379 |
| 7,022,379 | B2 | 4/2006 | Winterton et al. | |
| 7,045,087 | B2 | 5/2006 | Kotov | |
| 7,932,299 | B2 * | 4/2011 | Chisholm et al. | 521/27 |
| 2003/0228523 | A1 | 12/2003 | DeLongchamp et al. | |
| 2006/0062982 | A1 * | 3/2006 | Hammond Cunningham et al. | 428/220 |
| 2007/0020501 | A1 * | 1/2007 | Li et al. | 429/33 |

OTHER PUBLICATIONS

International Search Report for PCT/US09/032835 mailed Aug. 25, 2009.
Decher, G. "Fuzzy Nanoassemblies: Toward Layered Polymeric Multicomposites," *Science* 277: 2132-1237 (1997).
DeLongchamp, D. et al., "Ion Conduction in Layer-by Layer Polymer Films," Abstract of Papers, 221st ACS National Meeting, San Diego, CA, United States, Apr. 1-5, 2001. Accession No. 2001:203834. Publisher: American Chemical Society. The publication date of the reference is not known, but it is known that the reference was published more than one year before the earliest effective filing date of the application.
DeLongchamp, D. et al., "Ion Conduction in Layer-by Layer Polymer Films," Proceedings Published 2001 by the American Chemical Society. *Polymeric Materials: Science & Engineering* 84: 241-242 (2001).
DeLongchamp, D. et al., "High-Contrast Electrochromism from Layer-by Layer Polymer Films," *Chem. Mater.* 15: 1575-1586 (2003).
DeLongchamp, D. et al., "Highly Ion Conductive Poly(ethylene oxide)-Based Solid Polymer Electrolytes from Hydrogen Bonding Layer-by Layer Assembly," *Langmuir* 20:5403-5411 (2004).
Fahrat, T. R. et al., "Designing a New Generation of Proton-Exchange Membranes Using Layer-by-Layer Deposition of Polyelectrolytes," *Adv. Funct. Mater.* 15: 945-954 (2005).
Lowman, G. M. et al., "Solid-State Dye-Sensitized Solar Cells Combining a Porous TiO$_2$ Film and a Layer-by-Layer Composite Electrolyte," *small* 1(11): 1070-1073 (2005).
Tokuhisa, H. et al., "Solid-State Photovoltaic Thin Films using TiO$_2$, Organic Dyes, and Layer-by-Layer Polyelectrolyte Nanocomposites," *Adv. Funct. Mater.* 13: 831-839 (2003).
Walker, M. et al., "Proton-Conducting Polymers with Reduced Methanol Permeation," *Journal of Applied Polymer Science* 74: 67-73 (1999).

* cited by examiner

*Primary Examiner* — Ula C Ruddock
*Assistant Examiner* — Thomas Parsons
(74) *Attorney, Agent, or Firm* — Dana M. Gordon; Foley Hoag LLP

(57) ABSTRACT

Herein are disclosed methods, and compositions produced using them, to assemble highly conducting, hydrolytically stable polymer electrolyte films from commercially-available, water-soluble polymers using layer-by-layer assembly technology. In certain embodiments, these films can be used for electrochemical device applications which require an ion-conducting material to operate. For example, the power efficiency of any electrochemical device with a solid polymer electrolyte layer can be increased by this technology by virtue of the low ionic resistance of these layer-by-layer assembled thin film electrolytes. Specifically, direct-methanol operated fuel cells (DMFCs) should benefit remarkably, as the described technology offers very high conductivity values at fully hydrated conditions with low fuel (methanol) crossover.

14 Claims, 13 Drawing Sheets

LPEI

PAH

PDAC

| Membrane | Conductivity [a] [mS/cm] | Permeability $(P \times 10^8)$ [cm$^2$/s] |
|---|---|---|
| Nafion® 1135 | 98 | 282 |
| PDAC/sPPO | 35.3 [b] | 2.18 |
| PAH/sPPO | 4.23 [c] | 0.57 |
| LPEI/sPPO | 2.12 [c] | 1.38 |
| P4VP/sPPO | 1.65 [c] | 0.84 |
| LPEI/PAA | 0.01 [d] | N/A |

HIGHLY CONDUCTING SOLID STATE IONICS FOR ELECTROCHEMICAL SYSTEMS AND METHODS OF FABRICATING THEM USING LAYER-BY LAYER TECHNOLOGY

RELATED APPLICATIONS

This application claims the benefit of priority to U.S. Provisional Patent Application Ser. No. 61/025,096, filed Jan. 31, 2008; which is hereby incorporated by reference in its entirety.

BACKGROUND

The worldwide need for clean and sustainable energy is constantly increasing and electrochemical devices, such as batteries, fuel cells, and dye-sensitized photovoltaic cells, are among the most promising sources. (B. Smitha, S. Sridhar, A. A. Khan, *Journal of Membrane Science* 2005, 259, 10; G. Wegner, *Polymers for Advanced Technologies* 2006, 17, 705; R. G. Rajendran, *MRS Bulletin* 2005, 30, 587; and W. Vielstich, A. Lamm, H. A. Gasteiger, *Handbook Of Fuel Cells: Fundamentals, Technology, and Applications*, Wiley, Chichester, England; New York, 2003.) At the core of these devices is an electrolyte which facilitates charge transport between electrodes. Commonly used liquid or gel electrolytes preclude widespread use of these devices due to processing difficulties and safety concerns. However, polymer ionic conductors offer high mechanical strength and greater fabrication flexibility compared to traditional electrolytes, as well as better physical separation of electrodes. Polymer electrolytes are generally thin films that facilitate the transport of a given ion or ions at predetermined operating conditions. Although the desired properties of solid polymer electrolytes depend on the device application, fast ion conduction is essential to reduce electrical resistance.

Layer-by-layer (LBL) assembly is a versatile thin-film fabrication technique which consists of the repeated, sequential immersion of a substrate into aqueous solutions of complementary functionalized materials. (G. Decher, *Science* 1997, 277, 1232.) Utilizing electrostatic forces or secondary interactions, such as hydrogen bonding, LBL processing provides nanoscale blending of polymers and other organic/inorganic materials which are otherwise impossible to construct. The composition, morphology, and bulk properties are controlled by adjusting assembly parameters, such as pH and ionic strength. This technique has been adapted to many other platforms, such as spraying, spin-assisted assembly, and roll-to-roll processing. (J. Cho, K. Char, J. D. Hong, K. B. Lee, *Advanced Materials* 2001, 13, 1076.) The high versatility, tunability, and ease of processing from the ability to use aqueous solutions make this system a great competitor to traditionally assembled solid state conductors. Previously, LBL assembled systems have shown promise as thin film conductors for photovoltaics, electrochromic devices, and fuel cells, but they were limited in scope of application due to low ion conductivity values. (G. M. Lowman, P. T. Hammond, *Small* 2005, 1, 1070; D. M. DeLongchamp, M. Kastantin, P. T. Hammond, *Chemistry of Materials* 2003, 15, 1575; T. R. Farhat, P. T. Hammond, *Advanced Functional Materials* 2005, 15, 945.) To illustrate, the highest conductivity values achieved in an LBL film to date have been on the order of $10^{-5}$ S/cm, while typical values for fully hydrated LBL films are in the $10^{-7}$ to $10^{-9}$ S/cm range. (D. M. DeLongchamp, P. T. Hammond, *Langmuir* 2004, 20, 5403; and D. M. DeLongchamp, P. T. Hammond, *Chemistry of Materials* 2003, 15, 1165.)

Because the LBL films can be tailored to deposit any polyelectrolyte (PE) couple to any desired thickness, ranging from a few angstroms to a few microns, they are much less expensive technology than conventional membranes. Ion permeability and ion conductivity in LBL films have been extensively studied and characterized. (Krasemann, L.; Tieke, B. *Langmuir* 2000, 16, 287; Farhat, T. R.; Schlenoff, J. B. *Langmuir* 2001, 17, 1184-1192; Farhat, T. R.; Schlenoff, J. B. *J. Am. Chem. Soc.* 2003, 125, 4627-4636; Harris, J. J.; DeRose, P. M.; Bruening, M. L. *J. Am. Chem. Soc.* 1999, 121, 1978; DeLongchamp, D. M.; Hammond, P. T. *Chem. Mater.* 2003, 15, 1165-1173; and DeLongchamp, D. M.; Hammond, P. T. *Abstr. Pap. Am. Chem. Soc.* S22:136-PMSE, Part 2 2001.) The diffusion coefficient of ions of conventional polymer multilayers is a few orders of magnitude lower than the classical ion exchanger membranes hence their proton conduction is lower. However, a range of multilayer systems which incorporate hydrophilic polymers using electrostatic and hydrogen bonding mechanisms, and have shown increases in ionic conductivity of three or four orders of magnitude. (DeLongchamp, D. M.; Hammond, P. T. *Chem. Mater.* 2003, 15, 1165-1173; DeLongchamp, D. M.; Hammond, P. T. *Abstr. Pap. Am. Chem. Soc.* S22:136-PMSE, Part 2 2001; and Tokuhisa, H.; Hammond, P. T. *Adv. Funct. Mater.* 2003, 13, 831-839.) These differences are further enhanced by the fact that ultra thin films can be formed using the LBL technique, making the final conductance closer to that required for power applications. One can tune the thickness and permeability, as well as the composition, of these films through choice of polyelectrolytes and adsorption conditions. For example, using strong polyelectrolytes with hydrocarbon backbones yields LBL films that tend to be either strongly or moderately hydrophobic, thus discouraging proton exchange. On the other hand, LBL films assembled using weak electrostatic and secondary interactions (i.e., long-range hydrogen bonding or dipole-dipole), particularly those with hydrophilic backbones, support proton-exchange.

There remains a need for improved ion-conducting materials for electrochemical device applications for devices such as, for example, proton-exchange membrane fuel cells, electrochemical splitting of water, photovoltaic cells, sensors, dye-sensitized photovoltaic cells, light-emitting electrochemical cells, batteries, and electrochromic devices.

SUMMARY OF THE INVENTION

Herein are disclosed methods, and compositions produced using them, to assemble highly conducting polymer electrolyte films from water-soluble polymers using the layer-by-layer assembly technology. In certain embodiments, the films are stable to hydrolysis and or alcoholysis (e.g., methanolysis). In certain embodiments, the films are made from commercially-available polymers. In certain embodiments, these films can be used for electrochemical device applications which require an ion-conducting material to operate. For example, the power efficiency of any electrochemical device with a solid polymer electrolyte layer can be increased by this technology by virtue of the low ionic resistance of these layer-by-layer assembled thin film electrolytes. In certain embodiments, in addition to power efficiency, the assembled films disclosed herein offer easier film fabrication from inexpensive components, better interfaces between the device components, and/or more adaptability for specific applications. For example, direct-methanol operated fuel cells (DM- FCs) should remarkably benefit, as the described technology offers very high conductivity values at fully hydrated conditions with low fuel (methanol) crossover.

BRIEF DESCRIPTION OF THE FIGURES

FIG. 5 depicts a table of the ionic (proton) conductivity and methanol permeability of Nafion® 1135 and various LBL films. The permeability values of the LBL films are calculated by incorporating the composite permeability and permeability of the substrate ($P_{Nucleopore}=2.6 \times 10^9$ cm$^2$ s$^{-1}$) into Eq. 1 (as described below). Key: [a] At 98% relative humidity; [b] 0.5 M NaCl in the sPPO solution; [c] Assembly pH=2; and [d] See, D. M. DeLongchamp, P. T. Hammond, *Chemistry of Materials* 2003, 15, 1165.

DETAILED DESCRIPTION OF THE INVENTION

Figure 1:
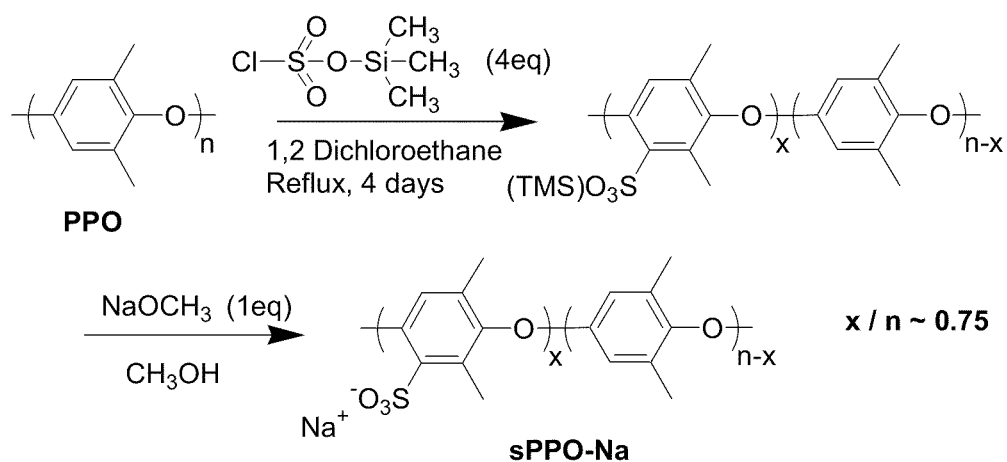
FIG. 1 depicts the chemical structures of selected polyelectrolytes: (a) sPPO prepared by sulfonation of PPO; and (b) polycations used for LBL assembly.
Figure 1:
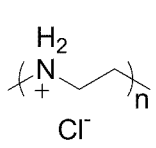
Figure 1:
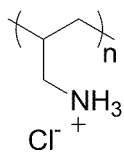
Figure 1:
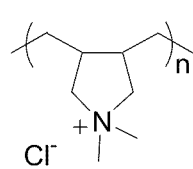
Figure 1:
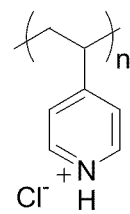

One aspect of the invention relates to electrolytes that may be used in solid state electrochemical devices. Solid state electrochemical devices often suffer from low ionic conductivity values of their polymer electrolyte component. However, as disclosed herein, highly conducting, layer-by-layer assembled electrolyte systems can be fabricated which will minimize performance losses associated with low ionic mobility. These systems also will allow for high composition control (e.g., by adjusting the initial assembly conditions), nanometer-level thickness accuracy, and are highly adaptable aqueous processing conditions.

While certain aspects of the invention discussed herein relate to electrolytes for use in fuel cells, it should be emphasized that the compositions of the present invention will find use as electrolytes in a variety of other solid state electrochemical devices. In fact, many if not all electrochemical devices which comprise an electrolyte could benefit from this invention; such devices include, but are not limited to dye-sensitized photovoltaic cells, light-emitting electrochemical cells, batteries, and electrochromic devices. In other words, the layer-by-layer films disclosed herein may be useful in replacing traditional liquid and gel ionic conductors in a variety of devices.

In certain embodiments, the present invention enables substantially improved direct-methanol operated fuel cells (DMFC). Current DMFCs use perfluorosulfonated membranes (e.g., Nafion®) that have high methanol permeability values, resulting in undesired fuel crossover. High fuel crossover reduces the overall power density of these devices. By introducing stabilized aromatic polymers as methanol barriers, along with a lightly crosslinked membrane structure, the subject invention yields methanol permeability values 100-500 times lower than the current standard, Nafion®.

Remarkably, herein is disclosed the highest ionic conductivity, $3.5 \times 10^{-2}$ S/cm at 100% RH, ever obtained from an LBL assembled thin film, which is an increase of three orders of magnitude in conductivity over previously reported systems and is the same order of magnitude as commercially relevant membranes such as Nafion® (which has an ionic conductivity of about $10^{-1}$ S/cm when fully hydrated). Furthermore, these multilayer systems exhibit low liquid methanol permeability, which permits fabrication to be at least one or two orders of magnitude thinner than Nafion°. This combination of properties enable application of these films as proton-exchange membranes in direct methanol fuel cells (DMFCs). Moreover, we have also discovered that simply coating a Nafion® membrane with 3 to 5 bilayers of a multilayer system can lead to significant increases (i.e., over 50%) in power output. We describe the systematic materials design approach used to assemble these systems, the high stability achieved with these films in fuel cells, and their resulting physical properties.

The high methanol permeability and high processing costs of Nafion® have prohibited wide-spread commercial use of DMFCs. (A. S. Arico, S. Srinivasan, V. Antonucci, *Fuel Cells* 2001, 1, 133.) When methanol permeates across the membrane, it hinders oxygen reduction at the DMFC cathode and significantly reduces the open-circuit voltage (OCV) of the device. (Z. Qi, A. Kaufman, *Journal of Power Sources* 2002, 110, 177.) Some approaches to reduce the methanol permeability of Nafion® include composite membranes with methanol barrier layers, introducing inorganic particles into the Nafion® membrane, and coating Nafion® with thin polyelectrolyte films. (S. P. Jiang, Z. Liu, Z. Q. Tian, *Advanced Materials* 2006, 18, 1068.) Interestingly, aromatic polymers offer low methanol permeability and high mechanical stability that make them promising candidates for use in direct methanol fuel cells (DMFCs). (M. A. Hickner, H. Ghassemi, Y. S. Kim, B. R. Einsla, J. E. McGrath, *Chemical Reviews* 2004, 104, 4587.) It has been stated that the polymers used thus far in the literature indicate that methanol permeability is lowest in polymers containing basic groups, such as amine, imine, and imidazole, and sulfur or oxygen containing aromatic polymers. (J. Roziere, D. J. Jones, *Annual Review of Materials Research* 2003, 33, 503.) One of the key polymers of interest in methanol fuel cells is sulfonic or phosphonic acid-doped polybenzimidazole (PBI); however, acid doped PBI in its charged form is only accessible by dissolving PBI in high acidic solutions, which is unfavorable for the use in layer-by-layer assembly processes. (J. S. Wainright, J. T. Wang, D. Weng, R. F. Savinell, M. Litt, *J. Electrochem. Soc.* 1995, 142, L121; and H. Pu, W. H. Meyer, G. Wegner, *J. Polym. Sci., Part B: Polym. Phys.* 2002, 40, 663.) One of the key polymers of interest in methanol fuel cells is sulfonic or phosphonic acid-doped polybenzimidazole (PBI); however, acid-doped PBI is only accessible in its charged form in extremely acidic aqueous solutions, making it a system which is unsuitable for incorporation in multilayer thin films. On the other hand, more readily processed materials are accessible, and many of these have exhibited high conductivity and permselective properties toward methanol. Poly(2,6-dimethyl 1,4-phenylene oxide) (PPO) is a thermally and mechanically stable aromatic polyether with excellent chemical resistance. Sulfonated forms of PPO (sPPO) can be obtained by dissolving PPO in a common organic solvent and directly sulfonating the aromatic ring through electrophilic aromatic substitution. (K. Bouzek, S. Moravcova, Z. Samec, J. Schauer, *Journal of the Electrochemical Society* 2003, 150, E329; and S. Yang, C. Gong, R. Guan, H. Zou, H. Dai, *Polymers for Advanced Technologies* 2006, 17, 360.) It is expected that the increased ionic content within the sPPO matrix may ultimately result in the solubility of the polymer in water and methanol, leading to swelling and ultimately dissolution of neat sPPO cast membranes in methanol/water solutions used in fuel cells; for this reason, the degree of sulfonation reported in the literature for fuel cell applications is rarely above 30-40%. (B. Jung, B. Kim, J. M. Yang, *Journal of Membrane Science* 2004, 245, 61; and B. Kim, B. Jung, *Macromolecular Rapid Communications* 2004, 25, 1263.) However, as reported herein, when sPPO systems are ionically crosslinked in an LBL film as a polyelectrolyte complex with a corresponding polycation, the resulting film is mechanically stable, insoluble in water, and has lower affinity for methanol. A similar effect has actually been reported by Walker et al. in experiments studying the methanol permeability of ionically crosslinked blends of aminated and sulfonated aromatic polymers where the polyacid/polybase pairs exhibited higher methanol perm-resistance than the homopolymers alone. (M. Walker, K. M. Baumgartner, M. Kaiser, J. Kerres, A. Ullrich, E. Rauchle, *Journal of Applied Polymer Science* 1999, 74, 67.) Further, the LBL approach allows a systematic examination of the effect of different polycationic backbones ranging in hydrophilic/hydrophobic character and basicity, as well as the impact of pH and ionic strength during assembly. Herein it is shown that by incorporating highly sulfonated PPO into LBL films and tuning the assembly parameters, one can produce robust, stable membranes assembled from aqueous solutions with high ion conduction and low methanol permeation.

PPO is soluble in most chlorinated solvents which allows for introduction of ionic carriers via postsulfonation. The sulfonation is achieved using trimethylsilyl chlorosulfonate (TMSCS) as the sulfonation agent as shown in the reaction scheme given in FIG. 1a. Unlike harsher reagents, such as chlorosulfonic acid, TMSCS allows better control of sulfonation and prevents chain scission. It also yields a higher degree of sulfonation as the TMS groups help maintain a homogeneous reaction with enough protection to screen charged sulfonated groups. (C. Tojoiu, M. Marechal, F. Chabert, J. Y. Sanchez, *Fuel Cells* 2005, 5, 344.) With conditions given in FIG. 1a, it is possible to obtain a water soluble polymer in its sodium form with a high degree of sulfonation (>70%) determined by titration and elemental analysis. This sodium salt is converted to its protonated form by dialyzing against acidic water. FTIR spectra obtained from the KBr pellet confirmed the successful sulfonation of PPO. Two peaks at 1075 $cm^{-1}$ and 677 $cm^{-1}$ appeared after sulfonation, indicative of the —$SO_3$ bands. Concurrently, two peaks (823 $cm^{-1}$ and 753 $cm^{-1}$) disappeared, showing the change of aromatic substitution from 1,2,4,6 to 1,2,3,4,6. (R. Y. M. Huang, J. J. Kim, *Journal of Applied Polymer Science* 1984, 29, 4017.) A thin film of sPPO is spun cast onto a glass slide to determine the ionic conductivity of the pristine polymer prior to LBL assembly. Using a two-probe conductivity cell connected to an AC impedance analyzer, the ionic conductivity is 335 mS/cm (25° C., 98% relative humidity) with low hydrolytic stability due to its solubility in water.

Figure 2:
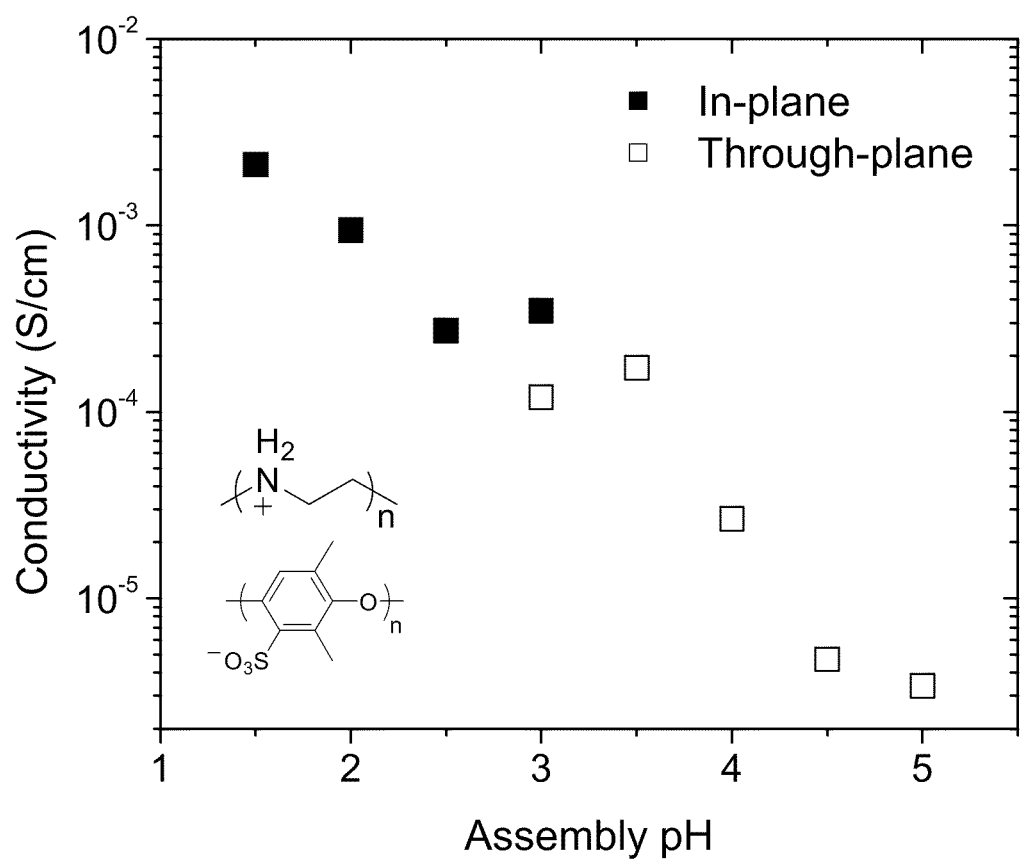
FIG. 2 depicts a graph showing the pH dependence of the ionic conductivity of LPEI/sPPO films measured both in-plane and through-plane.

FIG. 1b shows the structures of the water-soluble polycations that are paired with sPPO for the construction of LBL films. These polymers provide different hydrophilicity and basicity ranging from linear poly(ethylene imine) (LPEI) to poly(allylamine hydrochloride) (PAH), poly(diallyl dimethyl ammonium chloride) (PDAC), and poly(4-vinylpyridine) (P4VP). In order to determine the effect of assembly parameters on conductivity, 30 bilayers of sPPO and LPEI were deposited on glass slides and placed in a humidity controlled chamber. While sPPO is a strong polyacid, the ionization degree of LPEI is controlled by systematically varying the assembly pH from 1.5 to 5 for all polymer and rinse solutions. For layer-by-layer films assembled at a pH of about 3.0, the conductivity measurement is performed both in-plane (parallel to the substrate) and through-plane (orthogonal to the substrate) to confirm the proton conductivity is isotropic in the layer-by-layer film. However, below an assembly pH of about 3.0, the conductivity is measured only in-plane, as the through-plane resistance of the layer-by-layer thin film is too low to accurately measure. FIG. 2 shows the assembly pH dependence of proton conductivity for these films measured both in-plane (pH≤3, parallel to the substrate) and through-plane (pH≥3, orthogonal to the substrate). The conductivity increases from 0.02 mS/cm to 2.1 mS/cm by simply lowering the assembly pH. This value is already two orders of magnitude higher than the best reported value of an LBL system. Increasing the charge of a polymer results in an extended chain conformation in solution; this leads to decreases in its composition in the LBL film; therefore, at lower pH values, when LPEI becomes almost fully charged, we can maximize the amount of sPPO in the film. It is also important to note that the values obtained from through-plane and in-plane experiments match well, demonstrating that proton conduction is isotropic in these blends.

To demonstrate the effect of the polycation on the resulting nanolayered polymer blends, sPPO was paired with a more hydrophobic, strong polybase, PDAC. In this case, both polymers are strong polyelectrolytes, permanently charged in solution independent of pH. For this reason, the control of polymer conformation is possible by screening these charges by increasing the ionic strength. At 0.5 M NaCl added to the sPPO solution only, PDAC/sPPO yields the highest conductivity value of 35.3 mS/cm, approaching the fuel cell standard Nafion®, which is a perfluorosulfonated ionomer that relies on conducting pores within its morphology to achieve ion transport. It is believed that this is the highest ionic conductivity reported for an LBL assembled film. PAH and P4VP, two other pH dependent polycations, were also used to make LBL films paired with sPPO. FIG. 5 lists the conductivity values obtained from LBL films of sPPO complexed with these polycations along with the values of Nafion®. Differences in conductivity values of sPPO-containing layer-by-layer films are possibly due to variances of the relative amount of sPPO in the blends. Other factors that may impact ionic conductivity are the films' morphology, ionic crosslinking density, and secondary interactions between the PPO backbone and amine groups. Interestingly, in certain embodiments the conductivity is independent of film thickness, a parameter controlled by varying the number of bilayers. These new solid state ionic conductors will be of interest for a range of electrochemical applications, such as, for example, fuel cells, solar conversion of water, and photovoltaics.

With high conductivity values established, the methanol permeability of the various LBL systems was studied to determine their potential for DMFC application. A dual chamber apparatus was used, where the membrane sample is the separator between a 90% methanol/water (v/v) and pure water. A porous Nucleopore® membrane was used as the substrate material for determining permeability. The values shown in FIG. 5, $P_{LBL}$, are calculated from the following series resistance model (also referred to as the ideal laminate theory) for a composite tri-layer membrane with LBL film coating both sides of the Nucleopore® membrane:

$$P_{composite} = \left[ \frac{\phi_{LBL}}{P_{LBL}} + \frac{\phi_{Nucleopore}}{P_{Nucleopore}} + \frac{\phi_{LBL}}{P_{LBL}} \right]^{-1} \quad (1)$$

where $\phi_i$ corresponds to the thickness fraction of component i and $P_i$ is permeability of component i. After measuring the composite membrane permeability, the permeability of the LBL film, $P_{LBL}$, is calculated from the measured permeability of the substrate and the thickness fraction of all components in Eq. 1. All of the sPPO-based LBL systems have methanol permeability values at least two orders of magnitude lower than Nafion®, as shown in FIG. 5.

Figure 3:
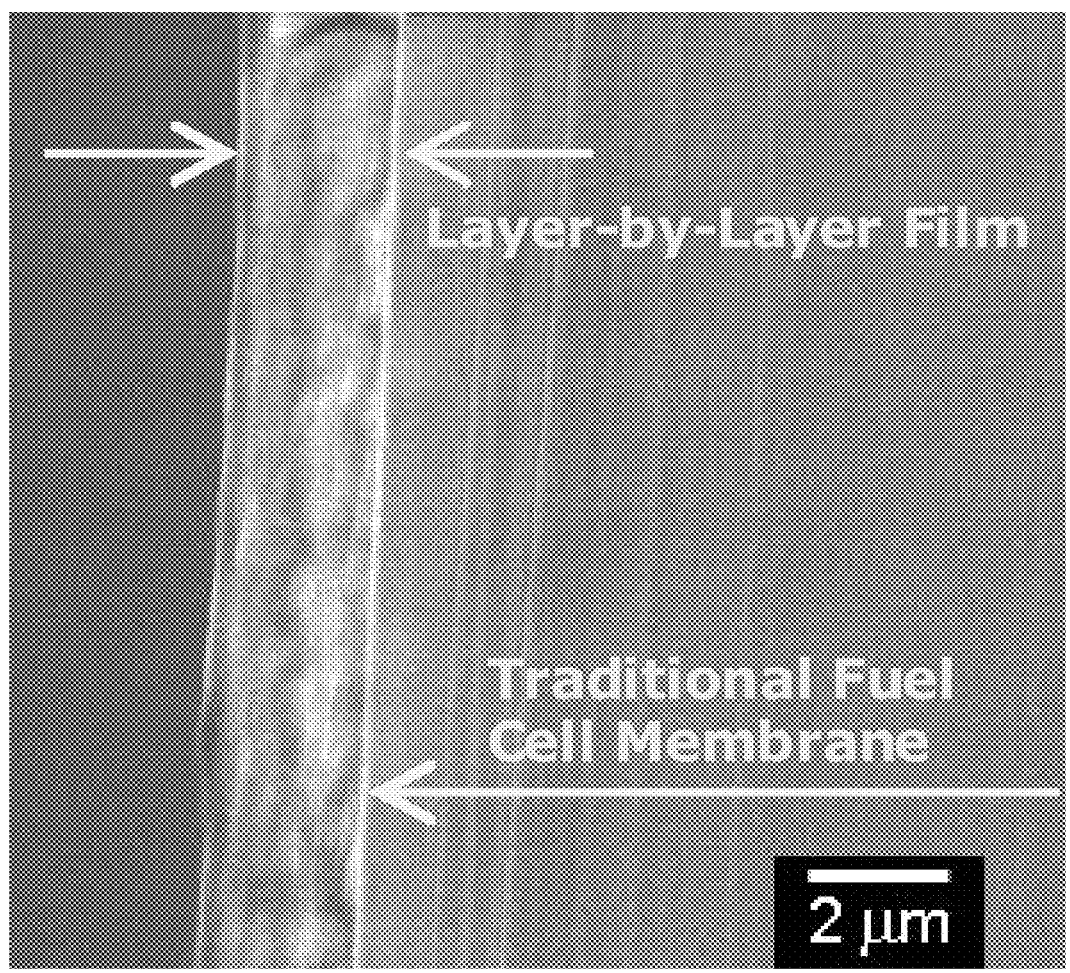
FIG. 3 depicts a SEM cross-sectional image of Nafion® 1135 coated with 25 bilayers of PDAC/sPPO. Nafion® 1135 is the amorphous region on the right side, and the LBL film is the lighter band adhered to the surface of the Nafion® 1135 membrane.

In general, more sulfonated PPO systems are more permeable to methanol, thereby eliminating any advantage with respect to Nafion® when used in the solid state. However, by introducing various polycations lightly crosslinked with sPPO, it is possible to lower methanol permeability without sacrificing the ionic conductivity. For example, while the ionic conductivity of PDAC/sPPO is 3-fold lower than Nafion®, having methanol permeability values over two orders of magnitude less than Nafion® provides a window where coating Nafion® with a thin layer of this LBL material can enhance fuel cell performance. To ensure that Nafion® is uniformly coated in the LBL assembly process, a cross-sectional SEM image of Nafion® coated with 25 bilayers of PDAC/sPPO is shown in FIG. 3. The same film deposited onto glass was 2.5 µm thick, and FIG. 3 confirms that this amount of film is also deposited onto Nafion® during the LBL assembly process. FIG. 3 also shows that there is a sharp transition between the amorphous Nafion® on the right and the lighter shaded band of LBL film, which further confirms that the LBL film conformally coats and does not penetrate into the Nafion® membrane.

Figure 4:
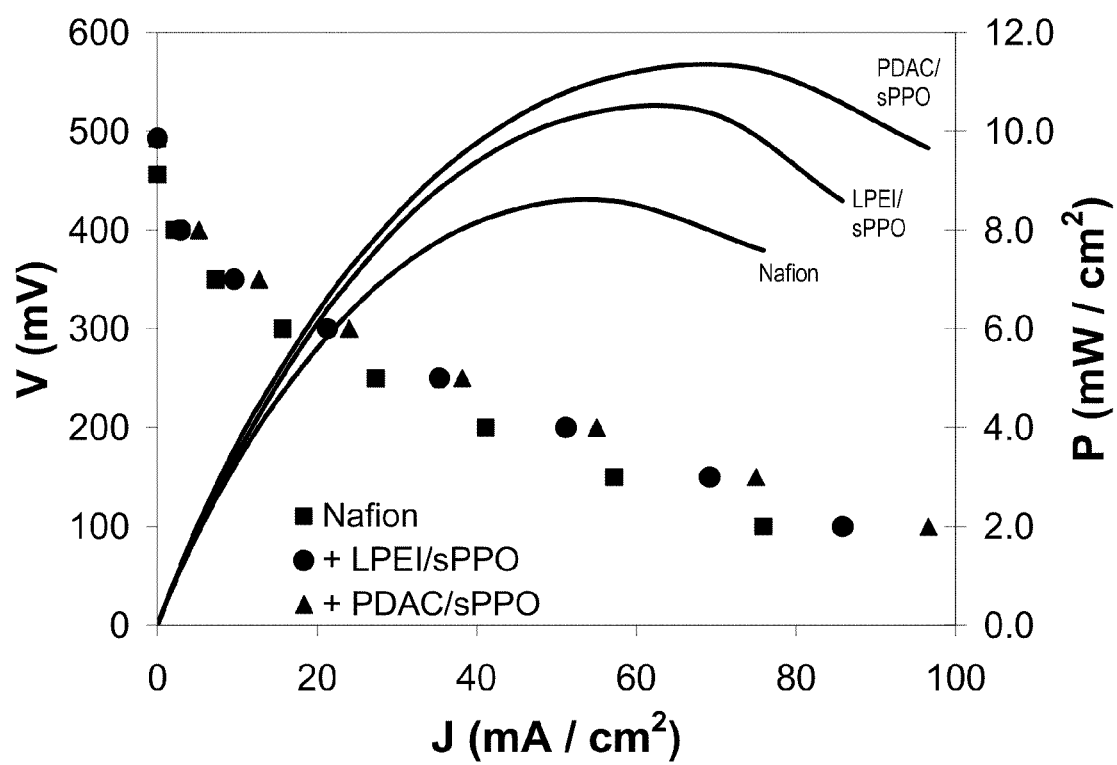
FIG. 4 depicts a graph showing polarization and power curves of DMFCs, which compares unmodified Nafion® 1135, and Nafion® 1135 membranes coated with LBL films of LPEI/sPPO and PDAC/sPPO, respectively.
Figure 6:
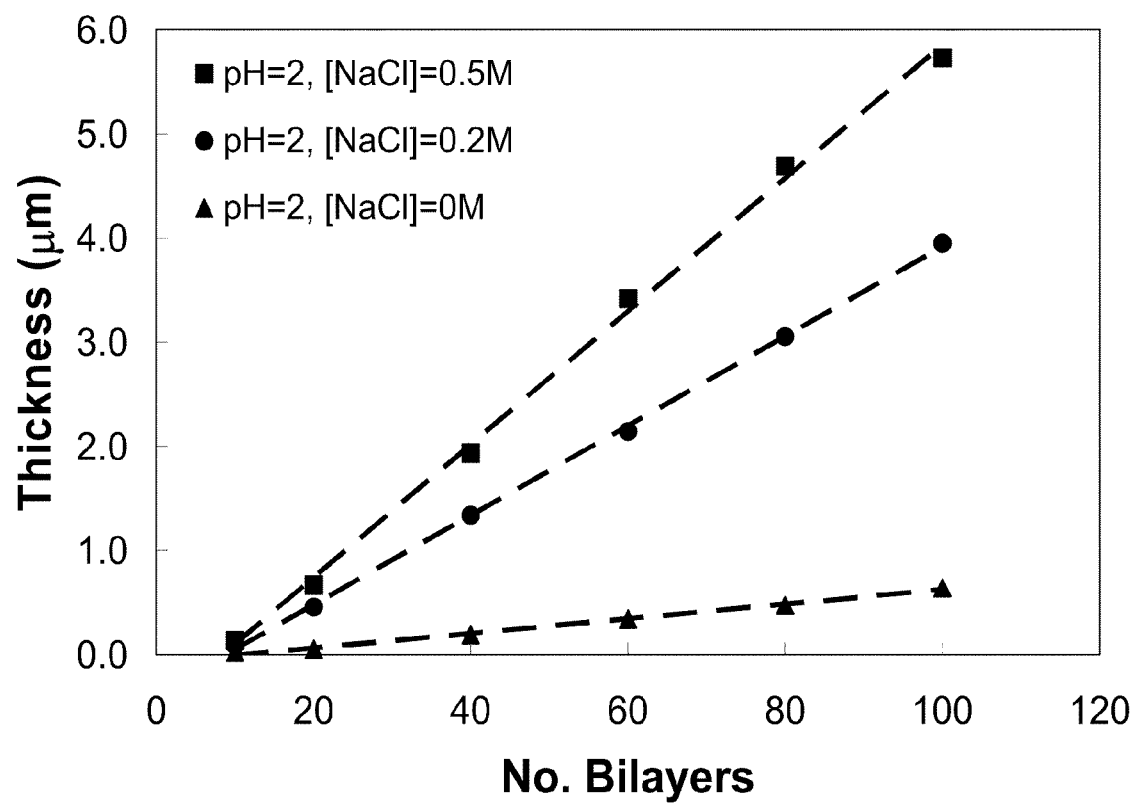
FIG. 6 depicts the layer-by-layer growth curves of PDAC/sPPO films at various ionic strengths. Note that the film growth is linear for all conditions.
Figure 7:
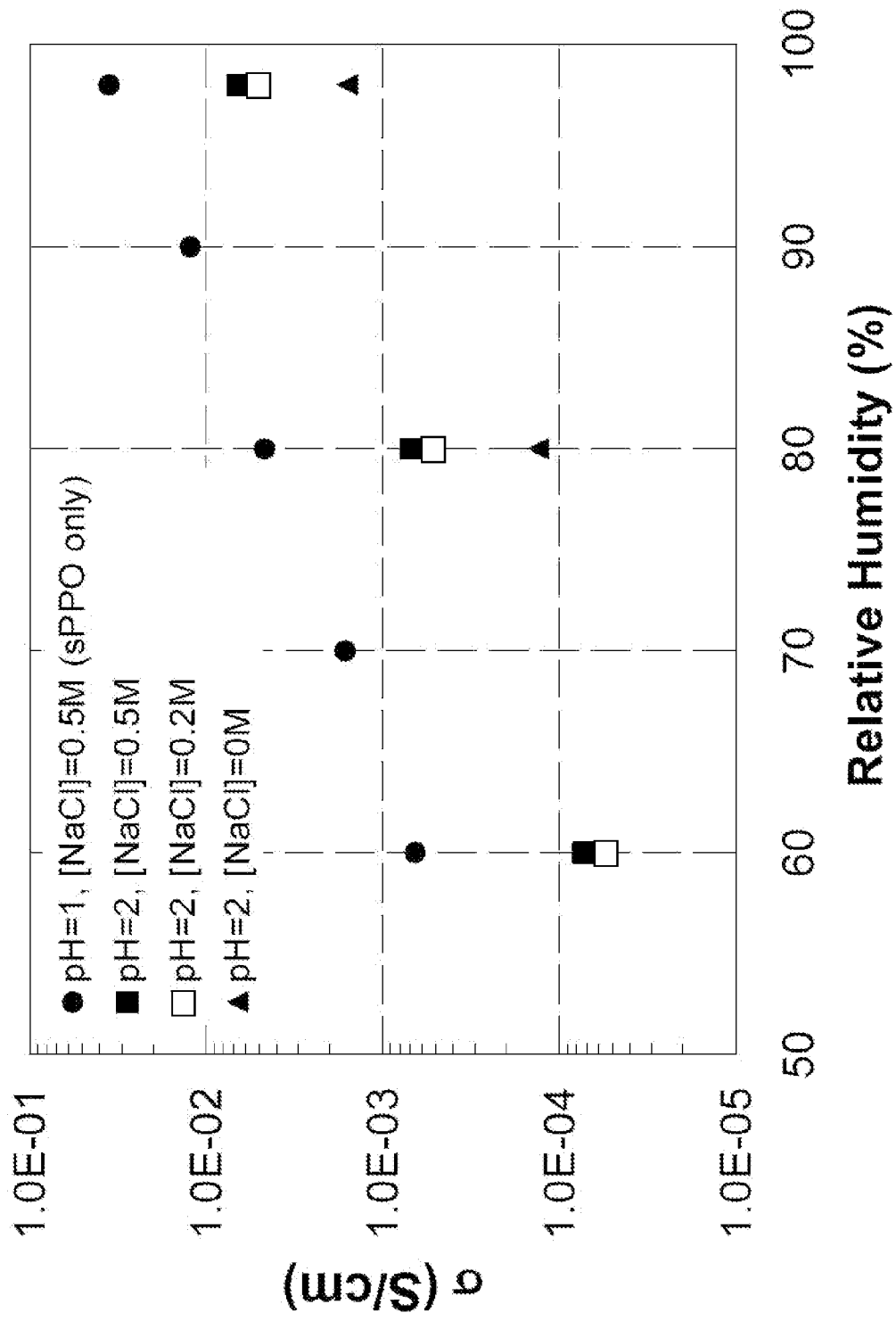
FIG. 7 depicts a graph showing the relative humidity dependence of the conductivity of PDAC/sPPO films assembled at various ionic strengths.
Figure 8:
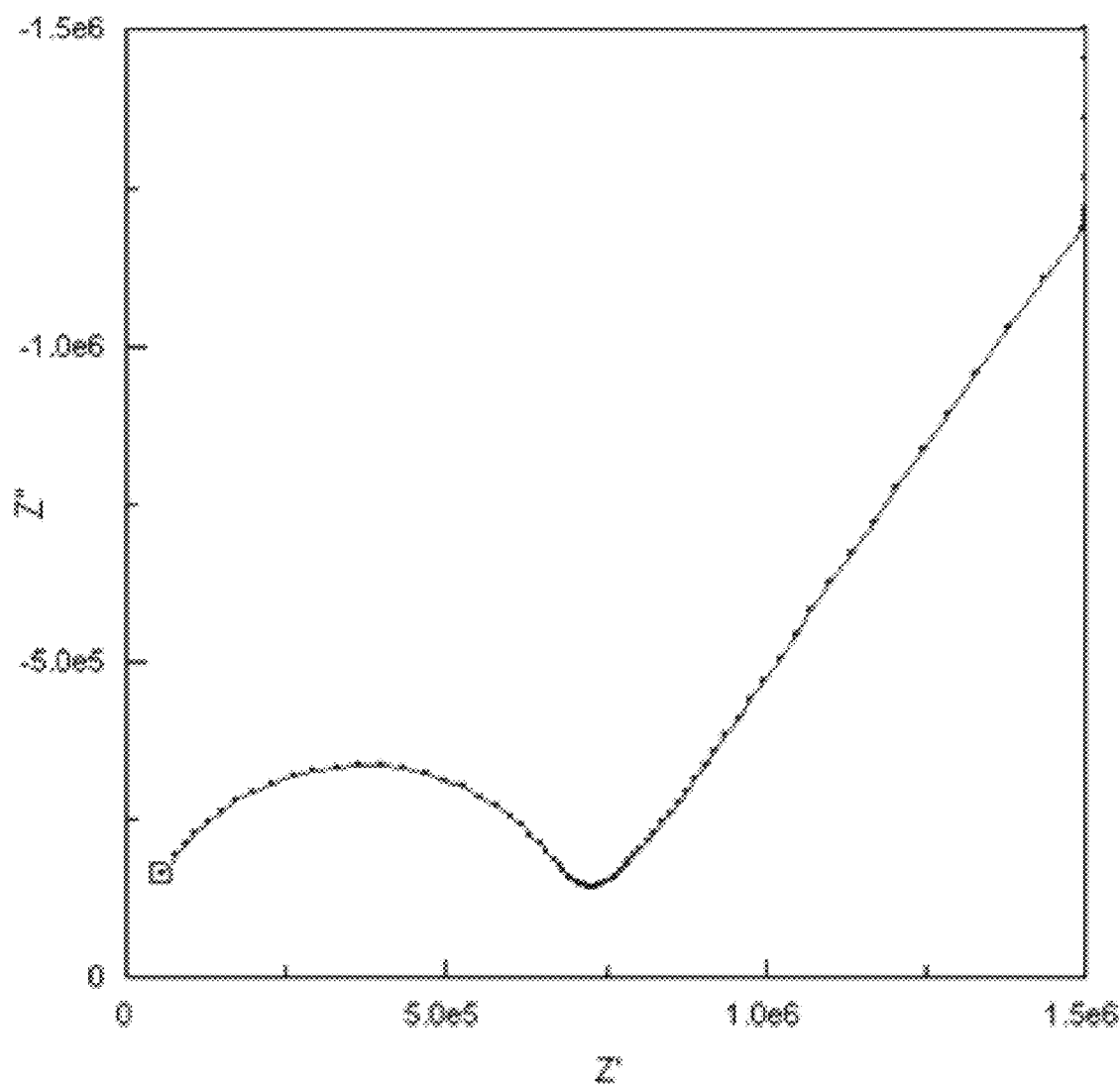
FIGS. 8 and 9 show representative impedance spectroscopy data for the PDAC/sPPO LBL films (ZPlot software). This is obtained by sweeping the AC frequency from 1,000,000 Hz down to 1 Hz. Using an in-plane measurement technique, the resistance of the films can be measured, which gives the ionic conductivity of the LBL films. More specifically, the in-plane resistance of a thin film is obtained from the complex plot (FIG. 8) by measuring the diameter of the semicircle. Also shown are the impedance vs. frequency plot (FIG. 9, top) and the theta vs. frequency plot (FIG. 9, bottom).
Figure 9:
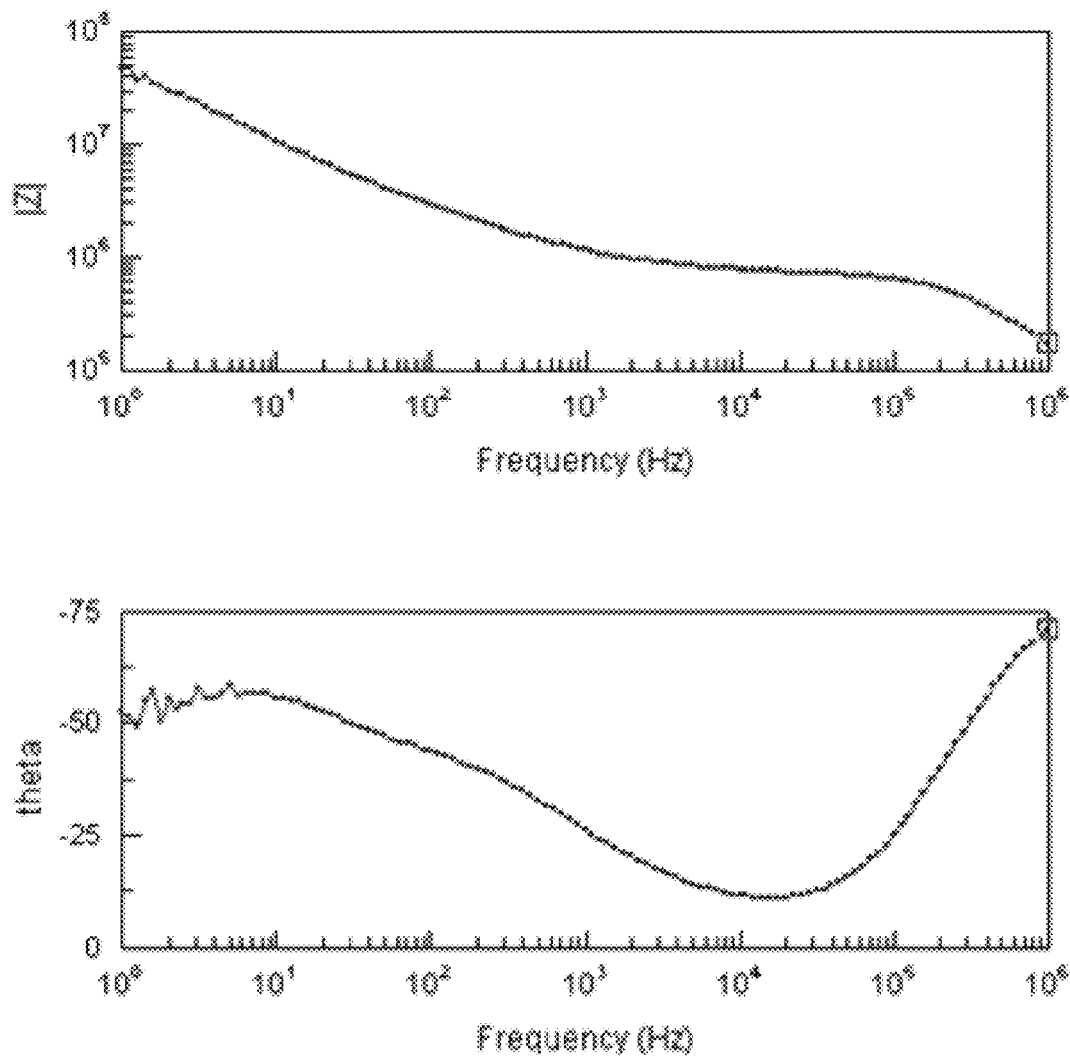
Figure 10:
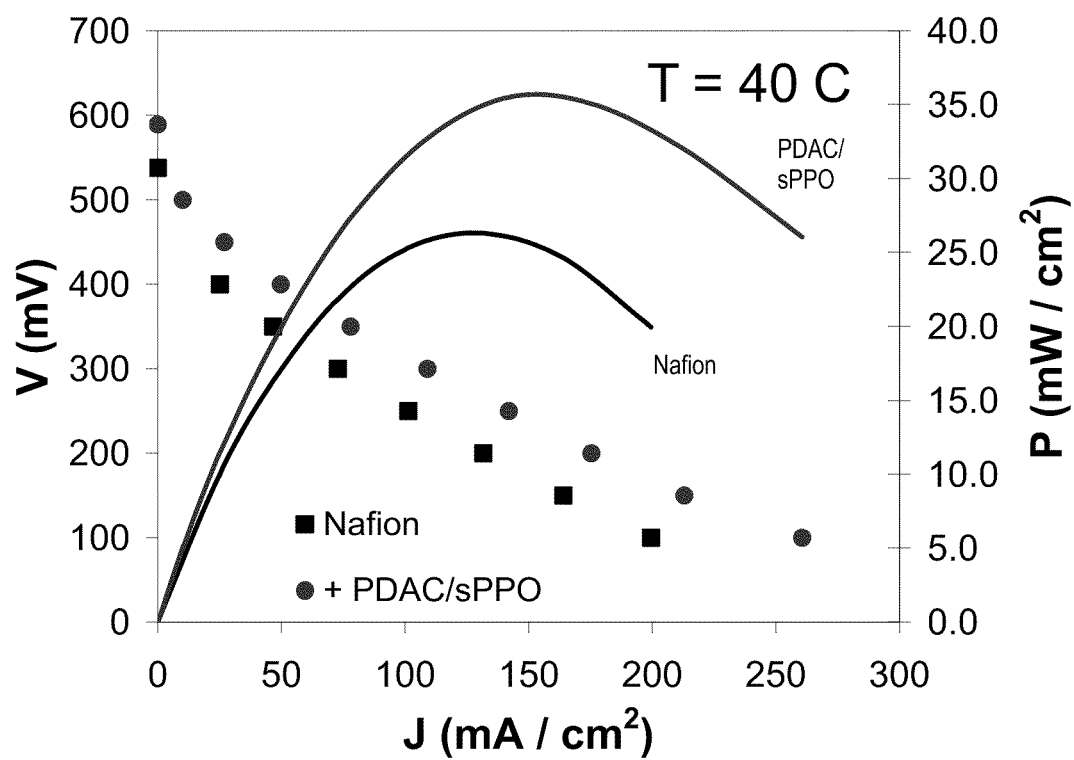
FIG. 10 depicts a graph showing polarization and power curves of DMFCs at 40° C., which compares unmodified Nafion® 1135 and Nafion® 1135 membranes coated with an LBL film of PDAC/sPPO.
Figure 11:
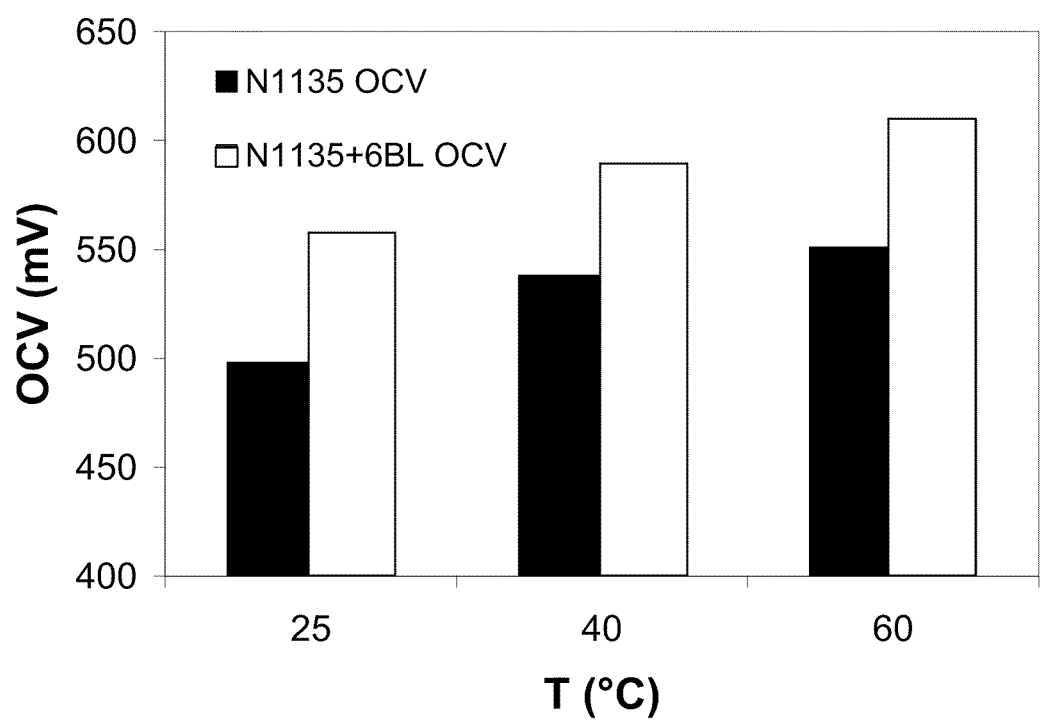
FIG. 11 shows the open circuit voltages (OCV) for DMFCs with Nafion® membranes and Nafion® membranes coated with PDAC/sPPO at three different temperatures. The increased OCV for the LBL systems shows that reduced methanol crossover leads to improved device performance.
Figure 12:
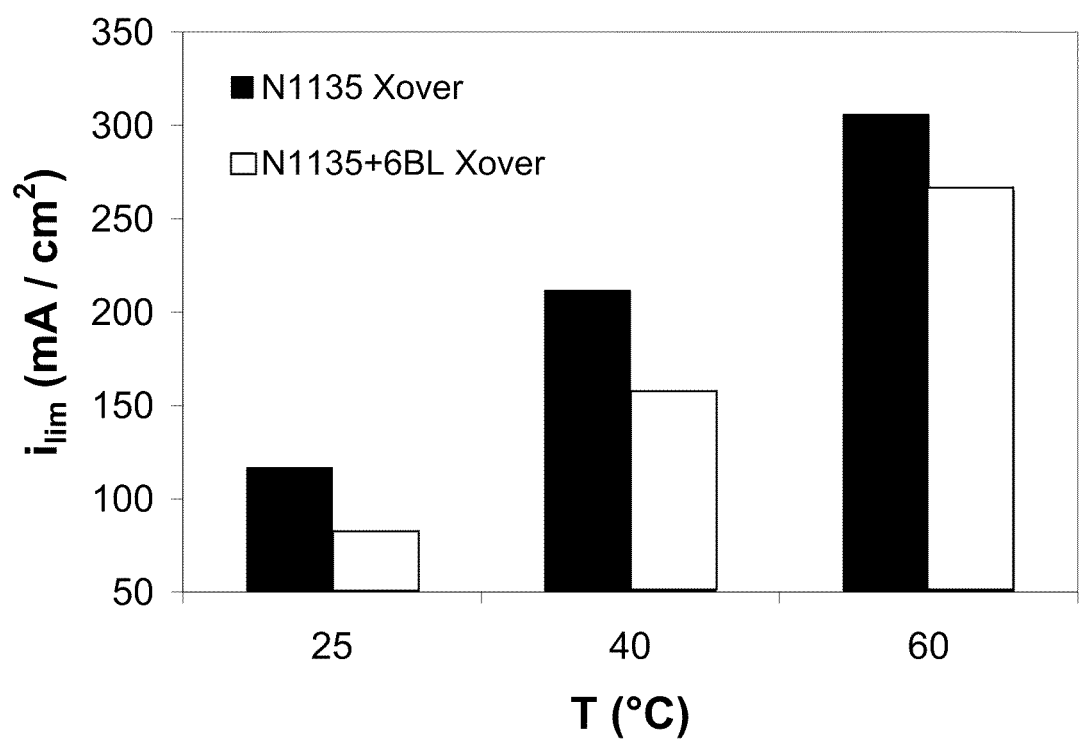
FIG. 12 shows the methanol crossover current for DMFCs with Nafion® membranes and Nafion® membranes coated with PDAC/sPPO at three temperatures. The reduced methanol crossover current proves the LBL systems have lower methanol crossover than Nafion® in a functioning DMFC.

Further, we have demonstrated the high ionic conductivity and methanol resistance of sPPO based LBL films, and their use as coatings for Nafion® membranes in DMFCs. The DMFC performance of a single cell MEA with unmodified Nafion® and devices where Nafion® membranes are coated with LBL films of LPEI/sPPO and PDAC/sPPO are shown in FIG. 4. All three devices were tested under the same conditions with 10% methanol/water (v/v) fed to the anode and air to the cathode at 25° C. It was found that for each LBL system used, there were an optimal number of bilayers that result in the best DMFC performance for coating Nafion®. For LPEI/sPPO, the optimal coating was ten bilayers corresponding to a 0.15 µm thick film on both sides of Nafion®, while three bilayers of PDAC/sPPO, which is 0.13 µm of film, is the optimum for this LBL system. The best performing system, PDAC/sPPO coated Nafion®, had a peak power of 11.3 mW/cm², which is 31.4% higher than plain Nafion®. The LPEI/sPPO coating had a more modest improvement in peak power of 22.1% above plain Nafion®. At a typical operating voltage of 0.3 V, the PDAC/sPPO coated Nafion® DMFC produced 53.2% more power than unmodified Nafion®, while the LPEI/sPPO coated device improved 36.2% in power output. Also, the OCV for both Nafion® coated devices improved to 493 mV, which is almost 40 mV higher than plain Nafion®. We attribute the higher OCV of the coated membranes to the fact that the LBL systems have lower methanol permeability values than Nafion®. However, since the LBL systems have lower proton conductivity values, we observed a trade-off between reduced methanol permeability and decreased conductivity as we increase the thickness of the LBL coatings. Devices with thinner LBL coatings than shown in FIG. 4 also had improved performance over Nafion®. Increasing the thickness of the LBL coating above what is shown in FIG. 4 resulted in decreased fuel cell performance. Therefore, below the optimal coating thickness, the reduced methanol permeability of the composite membrane outweighs the decrease in ionic conductivity, and above the optimal coating, the reduction in ionic conductivity dominates, causing a decrease in device performance.

In summary, using the LBL technique, remarkable solid state thin films with conductivity values over three orders of magnitude higher than the previous best performing multi-layer films were produced, making the LBL system a competitor for use as a solid electrolyte (e.g., for fuel cell applications). For example, by pairing sPPO with PDAC in an LBL film and optimizing the assembly conditions, we achieved conductivity values up to 35.3 mS/cm. Coating Nafion® membranes with PDAC/sPPO improved DMFC performance by over 50% compared to unmodified Nafion®. In addition, fabrication of LBL free standing films from these materials would be a way of eliminating the need for a substrate. Since the LBL process involves water soluble processing with a highly controlled film composition, it is anticipated that these highly conducting films have great potential to be used in other electrochemical systems requiring highly conducting solid state conductors such as batteries, dye-sensitized photovoltaic cells, electrochromic devices, and sensors.

DEFINITIONS

For convenience, certain terms employed in the specification, examples, and appended claims are collected here.

The term "electrolyte" as used herein means any chemical compound that ionizes when dissolved.

The term "polyelectrolyte" or "polyion," as used herein, refer to a polymer which under some set of conditions (e.g., physiological conditions) has a net positive or negative charge. Polycations have a net positive charge and polyanions have a net negative charge. The net charge of a given polyelectrolyte or polyion may depend on the surrounding chemical conditions, e.g., on the pH.

The term "bilayer" is employed herein in a broad sense and is intended to encompass, a coating structure formed by alternatively applying, in no particular order, one layer of a first charged polymeric material and one layer of a non-charged polymeric material or a second charged polymeric material. It should be understood that the layers of the first charged polymeric material and the non-charged polymeric material (or second charged polymeric material) may be intertwined with each other in the bilayer.

The term "pH" as used herein means a measure of the acidity or alkalinity of a solution, equal to 7, for neutral solutions and increasing to 14 with increasing alkalinity and decreasing to 0 with increasing acidity.

The term "pH dependent" as used herein means a weak electrolyte or polyelectrolyte, such as polyacrylic acid, in which the charge density can be adjusted by adjusting the pH.

The term "pH independent" as used herein means a strong electrolyte or polyelectrolyte, such as polystyrene sulfonate, in which the ionization is complete or very nearly complete and does not change appreciably with pH.

The term "$K_a$" as used herein means the equilibrium constant describing the ionization of a weak acid.

The term "$pK_a$" as used herein means a shorthand designation for an ionization constant and is defined as $pK_a = -\log K_a$. $pK_a$ values are useful when comparing the relative strength of acids.

For purposes of this invention, the chemical elements are identified in accordance with the Periodic Table of the Elements, CAS version, Handbook of Chemistry and Physics, 67th Ed., 1986-87, inside cover.

The following are a few of the polymers which may be used in the multilayer depositions of the present invention:

| Polymer Name | Polymer Abbreviation | Polymer Structure |
| --- | --- | --- |
| Mono-sulfonated poly(2,6-dimethyl 1,4-phenylene oxide) | sPPO | |
| Polyacrylic acid | PAA | |
| Polyacrylamide | PAAm | |
| Poly(allylamine hydrochloride) | PAH | |
| Polymethacrylic acid | PMA | |
| Polystyrene sulfonate | SPS | |

-continued

| Polymer Name | Polymer Abbreviation | Polymer Structure |
|---|---|---|
| poly(4-vinylpyridine) | P4VP | (structure: vinyl backbone with 4-pyridyl group) |
| Polydiallyldimethylammonium chloride | PDAC | (structure: pyrrolidinium ring with two methyl groups, Cl⁻ counterion) |
| Linear Poly(ethyleneimine) | LPEI | $-[CH_2-CH_2-NH]_n-$ |
| Poly(ethyleneoxide) | PEO | $-[CH_2-CH_2-O]_n-$ |
| Poly(2-acrylamido-2-methyl-1-propane sulfonic acid) | PAMPS | (structure: acrylamide backbone with $-C(CH_3)_2-CH_2-SO_3^-$ sidechain) |
| Poly(vinylpyrrolidone) | PVP | (structure: vinyl backbone with pyrrolidone ring) |
| Poly(vinylalcohol) | PVA | (structure: vinyl backbone with OH) |
| Poly(ethylene glycol) | PEG | $HO-[CH_2-CH_2-O]_n-H$ |
| Poly(aniline) | PANI | (structure: para-phenylene-NH repeat unit) |
| Poly(styrene sulfonic acid-maleic acid) | PSSM3:1 | (structure: 3 styrene sulfonate units and 1 maleate unit, $-COO^-$ $-COO^-$, $-SO_3^-$) |

| Polymer Name | Polymer Abbreviation | Polymer Structure |
|---|---|---|
| Poly(acryl-co-acrylamide acid) | PAA-co-AAm | $\left[\begin{array}{c}\phantom{}\\-CH_2-\underset{\underset{-OOC}{\vert}}{\overset{\overset{H}{\vert}}{C}}-CH_2-\underset{\underset{H_2N(O)C}{\vert}}{\overset{\overset{H}{\vert}}{C}}-\\\phantom{}\end{array}\right]_n$ |
| Poly(dimethylamine-co-epichlorohydrin) | PDME | $\left[\begin{array}{c}\phantom{}\\-\underset{\underset{CH_3}{\vert}}{\overset{\overset{CH_3}{\vert}}{N^+}}-\underset{\underset{Cl}{\vert}}{\overset{\overset{H}{\vert}}{C}}-CH_2O-\\\phantom{}\end{array}\right]_n$ |

The foregoing list is intended to be exemplary, but clearly is not exhaustive. A person skilled in the art, given the disclosure and teaching herein, would be able to select a number of other useful charged polymeric materials, such as, for example, sulfonated polyanions of polysulfones or polyetherletones.

Solid Electrolytes

One aspect of the invention relates to a solid electrolyte, comprising:
a plurality of polyelectrolyte bilayers;
wherein each bilayer comprises a polycationic layer and a polyanionic layer; the polycationic layer and the polyanionic layer are non-covalently bound to each other and the polycationic layer or polyanionic layer in an adjacent bilayer; the polyanionic layer includes a polymer including an anionic group selected from the group consisting of carboxylate, sulfonate, phosphate, and nitrate; and the anionic group is incorporated in the backbone of the polymer, covalently attached to the backbone of the polymer, or covalently attached to a pendant group of the polymer.

In certain embodiments, the present invention relates to any one of the aforementioned solid electrolytes, wherein the solid electrolyte comprises alternating polycationic and polyanionic layers.

In certain embodiments, the present invention relates to any one of the aforementioned solid electrolytes, wherein at least a portion of the polycationic layers include a polymer selected from the group consisting of linear poly(ethylene imine), poly(diallyl dimethyl ammonium chloride), poly(allylamine hydrochloride), poly(4-vinylpyridine), polysulfones, polyether lactones, and any combination thereof.

In certain embodiments, the present invention relates to any one of the aforementioned solid electrolytes, wherein at least a portion of the polycationic layers comprise poly(diallyl dimethyl ammonium chloride).

In certain embodiments, the present invention relates to any one of the aforementioned solid electrolytes, wherein the polyanionic layer includes a polymer including a sulfonate.

In certain embodiments, the present invention relates to any one of the aforementioned solid electrolytes, wherein the anionic group is covalently attached to the backbone of the polymer.

In certain embodiments, the present invention relates to any one of the aforementioned solid electrolytes, wherein the polyanionic layer is a monosulfonated poly(1,4-phenylene oxide) which is optionally further substituted an additional one, two or three times with substituents independently selected for each occurrence from the group consisting of halogen, alkyl, aralkyl, alkenyl, alkynyl, cycloalkyl, hydroxyl, alkoxy, aryloxy, amino, nitro, sulfhydryl, imino, amido, carbonyl, carboxyl, silyl, alkylthio, arylthio, heterocyclyl, aryl, heteroaryl, aralkyl, heteroaralkyl, perfluoroalkyl, and cyano.

In certain embodiments, the present invention relates to any one of the aforementioned solid electrolytes, wherein the polyanionic layer is a monosulfonated poly(2,6-dialkyl 1,4-phenylene oxide).

In certain embodiments, the present invention relates to any one of the aforementioned solid electrolytes, wherein the polyanionic layer is a monosulfonated poly(2,6-dimethyl 1,4-phenylene oxide).

In certain embodiments, the present invention relates to any one of the aforementioned solid electrolytes, wherein said monosulfonated poly(1,4-phenylene oxide) is at least about 50% sulfonated.

In certain embodiments, the present invention relates to any one of the aforementioned solid electrolytes, wherein said monosulfonated poly(1,4-phenylene oxide) is at least about 60% sulfonated.

In certain embodiments, the present invention relates to any one of the aforementioned solid electrolytes, wherein said monosulfonated poly(1,4-phenylene oxide) is at least about 70% sulfonated.

In certain embodiments, the present invention relates to any one of the aforementioned solid electrolytes, wherein said monosulfonated poly(1,4-phenylene oxide) is at least about 80% sulfonated.

In certain embodiments, the present invention relates to any one of the aforementioned solid electrolytes, wherein said monosulfonated poly(1,4-phenylene oxide) is at least about 90% sulfonated.

In certain embodiments, the present invention relates to any one of the aforementioned solid electrolytes, wherein said monosulfonated poly(1,4-phenylene oxide) is about 100% sulfonated.

In certain embodiments, the present invention relates to any one of the aforementioned solid electrolytes, wherein within at least one of the polyelectrolyte bilayers, the polycationic layer and the polyanionic layer are covalently cross-linked to one another.

In certain embodiments, the present invention relates to any one of the aforementioned solid electrolytes, wherein the cross-link is formed by a reaction including one or more of a double bond, carboxyl, thiol, amine, hydroxyl, halogen, carbodiimide, isocyanate, 3-[(2-aminoethyl)dithio]propionic acid, and succinimidyl 4-[N-maleimidomethyl]cyclohexane-1-carboxylate.

In certain embodiments, the present invention relates to any one of the aforementioned solid electrolytes, wherein about 10% of the polyelectrolyte bilayers are cross-linked.

In certain embodiments, the present invention relates to any one of the aforementioned solid electrolytes, wherein about 30% of the polyelectrolyte bilayers are cross-linked.

In certain embodiments, the present invention relates to any one of the aforementioned solid electrolytes, wherein about 50% of the polyelectrolyte bilayers are cross-linked.

In certain embodiments, the present invention relates to any one of the aforementioned solid electrolytes, wherein about 70% of the polyelectrolyte bilayers are cross-linked.

In certain embodiments, the present invention relates to any one of the aforementioned solid electrolytes, wherein about 90% of the polyelectrolyte bilayers are cross-linked.

In certain embodiments, the present invention relates to any one of the aforementioned solid electrolytes, wherein between about 10% to about 50% of the polyelectrolyte bilayers are cross-linked.

In certain embodiments, the present invention relates to any one of the aforementioned solid electrolytes, wherein between about 50% to about 90% of the polyelectrolyte bilayers are cross-linked.

In certain embodiments, the present invention relates to any one of the aforementioned solid electrolytes, further comprising a substrate; wherein the substrate is non-covalently bound to the polycationic layer or polyanionic layer in an adjacent bilayer.

The substrate may be any substrate that the charged species can be adsorbed directly, or indirectly with the aid of an adhesion promoter or tie layer. A variety of materials can be used as substrates in the present invention, such as but not limited to: metals, e.g., gold, silver, platinum, and aluminum; metal-coated materials; metal oxides; plastics; ceramics; silicon; glasses; mica; graphite; hydrogels; and polymers such as polyamides, polyphosphazenes, polypropylfumarates, polyethers, polyacetals, polycyanoacrylates, polyurethanes, polycarbonates, polyanhydrides, polyorthoesters, polyhydroxyacids, polyacrylates, ethylene vinyl acetate polymers and other cellulose acetates, polystyrenes, poly(vinyl chloride), poly(vinyl fluoride), poly(vinyl imidazole), poly(vinyl alcohol), poly(ethylene terephthalate), polyesters, polyureas, polypropylene, polymethacrylate, polyethylene, poly(ethylene oxide)s and chlorosulphonated polyolefins; and combinations thereof. For example, a substrate of one material may be coated with a second material, or two materials may be combined to form a composite.

In certain embodiments, the substrate may be a polymeric material, paper or a metallic material. The substrate may also be a polymeric material coated with an inorganic material. In one embodiment, the substrate is a fibrous material. In one embodiment, the substrate is optically transparent. Examples of useful polymeric substrates include those selected from polyolefins (linear or branched), halogenated polyolefins, polyamides, polystyrenes, nylon, polyesters, polyester copolymers, polyurethanes, polysulfones, styrene-maleic anhydride copolymers, styrene-acrylonitrile copolymers, ionomers based on sodium or zinc salts of ethylene methacrylic acid, polymethyl methacrylates, cellulosics, acrylic polymers and copolymers, polycarbonates, polyacrylonitriles, and ethylene-vinyl acetate copolymers. Included in this group are the acrylates such as ethylene methacrylic acid, ethylene methyl acrylate, ethylene acrylic acid and ethylene ethyl acrylate. Also included in this group are polymers and copolymers of olefin monomers having, for example, 2 to about 12 carbon atoms, and in one embodiment, 2 to about 8 carbon atoms. These include the polymer of .alpha.-olefins having from 2 to about 4 carbon atoms per molecule. These include polyethylene, polypropylene, poly-1-butene, etc. Films prepared from blends of copolymers or blends of copolymers with homopolymers are also useful. The substrate can be a single-layered film or it can be a multi-layered construction It will be appreciated that materials with an inherently charged surface are particularly attractive substrates for layer-by-layer assembly. Alternatively, a range of methods are known in the art that can be used to charge the surface of a material, including but not limited to plasma processing, corona processing, flame processing, and chemical processing, e.g., etching, micro-contact printing, and chemical modification. For example, plastics can be used as substrates, particularly if they have been chemically modified to present polar or charged functional groups on the surface. Additionally or alternatively, substrates can be primed with specific polyelectrolyte bilayers such as, but not limited to, LPEI/SPS, PDAC/SPS, PAH/SPS, LPEI/PAA, PDAC/PAA, and PAH/PAA bilayers, that form readily on weakly charged surfaces and occasionally on neutral surfaces. It will be appreciated that such primer layers provide a uniform surface layer for further layer-by-layer assembly and are therefore particularly well suited to applications that require the deposition of a uniform thin film on a substrate that includes a range of materials on its surface.

In certain embodiments, the present invention relates to any one of the aforementioned solid electrolytes, wherein the substrate comprises a material selected from the group consisting of metals, metal oxides, plastics, ceramics, silicon, glasses, mica, graphite, hydrogels, polymers, and any combination thereof.

In certain embodiments, the present invention relates to any one of the aforementioned solid electrolytes, wherein the substrate is tetrafluoroethylene-perfluoro-3,6-dioxa-4-methyl-7-octenesulfonic acid copolymer.

In certain embodiments, the present invention relates to any one of the aforementioned solid electrolytes, wherein the substrate interposed between two bilayers.

In certain embodiments, the present invention relates to any one of the aforementioned solid electrolytes, wherein the number of bilayers is about 200.

In certain embodiments, the present invention relates to any one of the aforementioned solid electrolytes, wherein the number of bilayers is about 150.

In certain embodiments, the present invention relates to any one of the aforementioned solid electrolytes, wherein the number of bilayers is about 100.

In certain embodiments, the present invention relates to any one of the aforementioned solid electrolytes, wherein the number of bilayers is about 50.

In certain embodiments, the present invention relates to any one of the aforementioned solid electrolytes, wherein the number of bilayers is about 30.

In certain embodiments, the present invention relates to any one of the aforementioned solid electrolytes, wherein the number of bilayers is about 25.

In certain embodiments, the present invention relates to any one of the aforementioned solid electrolytes, wherein the number of bilayers is about 20.

In certain embodiments, the present invention relates to any one of the aforementioned solid electrolytes, wherein the number of bilayers is about 15.

In certain embodiments, the present invention relates to any one of the aforementioned solid electrolytes, wherein the number of bilayers is about 10.

In certain embodiments, the present invention relates to any one of the aforementioned solid electrolytes, wherein the number of bilayers is about 5.

In certain embodiments, the present invention relates to any one of the aforementioned solid electrolytes, wherein the number of bilayers is between about 5 and about 100.

In certain embodiments, the present invention relates to any one of the aforementioned solid electrolytes, wherein the number of bilayers is between about 100 and about 200.

In certain embodiments, the present invention relates to any one of the aforementioned solid electrolytes, wherein the solid electrolyte has a thickness; and the thickness of the solid electrolyte is about 10 µm thick.

In certain embodiments, the present invention relates to any one of the aforementioned solid electrolytes, wherein the solid electrolyte has a thickness; and the thickness of the solid electrolyte is about 5 µm thick.

In certain embodiments, the present invention relates to any one of the aforementioned solid electrolytes, wherein the solid electrolyte has a thickness; and the thickness of the solid electrolyte is about 1 µm thick.

In certain embodiments, the present invention relates to any one of the aforementioned solid electrolytes, wherein the solid electrolyte has a thickness; and the thickness of the solid electrolyte is about 0.5 µm thick.

In certain embodiments, the present invention relates to any one of the aforementioned solid electrolytes, wherein the solid electrolyte has a thickness; and the thickness of the solid electrolyte is about 0.3 µm thick.

In certain embodiments, the present invention relates to any one of the aforementioned solid electrolytes, wherein the solid electrolyte has a thickness; and the thickness of the solid electrolyte is about 0.25 µm thick.

In certain embodiments, the present invention relates to any one of the aforementioned solid electrolytes, wherein the solid electrolyte has a thickness; and the thickness of the solid electrolyte is about 0.2 µm thick.

In certain embodiments, the present invention relates to any one of the aforementioned solid electrolytes, wherein the solid electrolyte has a thickness; and the thickness of the solid electrolyte is about 0.15 µm thick.

In certain embodiments, the present invention relates to any one of the aforementioned solid electrolytes, wherein the solid electrolyte has a thickness; and the thickness of the solid electrolyte is about 0.1 µm thick.

In certain embodiments, the present invention relates to any one of the aforementioned solid electrolytes, wherein the solid electrolyte has a thickness; and the thickness of the solid electrolyte is about 0.05 µm thick.

In certain embodiments, the present invention relates to any one of the aforementioned solid electrolytes, wherein the solid electrolyte has a thickness; and the thickness of the solid electrolyte is between about 0.05 µm and about 1 µm thick.

In certain embodiments, the present invention relates to any one of the aforementioned solid electrolytes, wherein the solid electrolyte has a thickness; and the thickness of the solid electrolyte is between about 1 µm and about 10 µm thick.

In certain embodiments, the present invention relates to any one of the aforementioned solid electrolytes, wherein solid electrolyte has an ionic conductivity; and the ionic conductivity of the solid electrolyte is about 10 mS/cm at 100% relative humidity.

In certain embodiments, the present invention relates to any one of the aforementioned solid electrolytes, wherein solid electrolyte has an ionic conductivity; and the ionic conductivity of the solid electrolyte is about 15 mS/cm at 100% relative humidity.

In certain embodiments, the present invention relates to any one of the aforementioned solid electrolytes, wherein solid electrolyte has an ionic conductivity; and the ionic conductivity of the solid electrolyte is about 20 mS/cm at 100% relative humidity.

In certain embodiments, the present invention relates to any one of the aforementioned solid electrolytes, wherein solid electrolyte has an ionic conductivity; and the ionic conductivity of the solid electrolyte is about 25 mS/cm at 100% relative humidity.

In certain embodiments, the present invention relates to any one of the aforementioned solid electrolytes, wherein solid electrolyte has an ionic conductivity; and the ionic conductivity of the solid electrolyte is about 30 mS/cm at 100% relative humidity.

In certain embodiments, the present invention relates to any one of the aforementioned solid electrolytes, wherein solid electrolyte has an ionic conductivity; and the ionic conductivity of the solid electrolyte is about 35 mS/cm at 100% relative humidity.

In certain embodiments, the present invention relates to any one of the aforementioned solid electrolytes, wherein solid electrolyte has an ionic conductivity; and the ionic conductivity of the solid electrolyte is between about 10 mS/cm and about 35 mS/cm at 100% relative humidity.

In certain embodiments, the present invention relates to any one of the aforementioned solid electrolytes, wherein the solid electrolyte has a methanol permeability; and the methanol permeability of the solid electrolyte is less than about $2.50 \times 10^{10}$ cm$^2$/s.

In certain embodiments, the present invention relates to any one of the aforementioned solid electrolytes, wherein the solid electrolyte has a methanol permeability; and the methanol permeability of the solid electrolyte is less than about $1.50 \times 10^{10}$ cm$^2$/s.

In certain embodiments, the present invention relates to any one of the aforementioned solid electrolytes, wherein the solid electrolyte has a methanol permeability; and the methanol permeability of the solid electrolyte is less than about $1.00 \times 10^{10}$ cm$^2$/s.

In certain embodiments, the present invention relates to any one of the aforementioned solid electrolytes, wherein the solid electrolyte has a methanol permeability; and the methanol permeability of the solid electrolyte is less than about $0.50 \times 10^{10}$ cm$^2$/s.

Another aspect of the invention relates to solid electrolytes which may be obtained by any one of the methods discussed below.

Methods of Layer-by-Layer Assembly

An exemplary layer-by-layer deposition techniques involves sequentially dipping a substrate into a pair of coating solutions. Alternatively, a substrate may be sprayed with a solution in a spray or mist form. One coating process embodiment involves solely dip-coating and optionally dip-rinsing steps. Another coating process embodiment involves solely spray-coating and optionally spray-rinsing steps. Of course, a number of alternatives involve various combinations of spray- and dip-coating and optionally spray- and dip-rinsing steps may be designed by a person having ordinary skill in the art.

For example, a solely dip-coating process involves the steps of immersing a substrate in a solution of a charged polymeric material; optionally rinsing the substrate by immersing the substrate in a rinsing solution; immersing said substrate in a solution of an oppositely charge polymeric material; and optionally rinsing said substrate in a rinsing solution, thereby forming a bilayer of the charged polymeric materials. This bilayer formation process may be repeated a plurality of times in order to produce a thicker layer-by-layer coating.

The immersion time for each of the coating and optional rinsing steps may vary depending on a number of factors. Preferably, immersion of the core material into a coating solution occurs over a period of about 1 to 30 minutes, more preferably about 1 to 20 minutes, and most preferably about 1 to 5 minutes. Rinsing may be accomplished with a plurality of rinsing steps, but a single rinsing step, if desired, can be quite efficient.

Another embodiment of the coating process involves a series of spray coating techniques. The process generally includes the steps of spraying a core material of a substrate with a solution of a charged polymeric material; optionally rinsing the substrate by spraying the substrate with a rinsing solution and then optionally drying the substrate; spraying the substrate with a solution of a non-charged polymeric material which can be non-covalently bond to the charged polymeric material on the substrate; optionally rinsing the substrate by spraying the substrate with a rinsing solution, thereby to form a bilayer of the charged polymeric material and the non-charged polymeric material. This bilayer formation procedure may be repeated a plurality of times in order to produce a thicker layer-by-layer coating.

The spray coating application may be accomplished via a process selected from the group consisting of an air-assisted atomization and dispensing process, an ultrasonic-assisted atomization and dispensing process, a piezoelectric assisted atomization and dispensing process, an electromechanical jet printing process, a piezo-electric jet printing process, a piezo-electric with hydrostatic pressure jet printing process, and a thermal jet printing process; and a computer system capable of controlling the positioning of the dispensing head of the spraying device on the ophthalmic lens and dispensing the coating liquid. Those spraying coating processes are described in U.S. Application No. 60/312,199, herein incorporated by reference in its entirety. By using such spraying coating processes, an asymmetrical coating can be applied to a substrate.

Another embodiment of the coating process involves spin-assisted layer-by-layer assembly. In certain embodiments, solid electrolytes with different thicknesses were fabricated by the spin-assembly or spin-assisted LbL (SA-LbL) method, which is a combination of spin-coating and conventional LbL techniques. See, for example, US Patent Application Pub. No. 2005/0175507; hereby incorporated by reference in its entirety. Spin-assisted LbL technique is a time- and cost efficient assembly and has been successfully applied to the deposition of a range of polyelectrolytes. The thickness of the deposited layers can be controlled by solvent evaporation, spin speed, spin time, and solute concentration. The SA-LbL process comprises placing a substrate on a spin coater and applying a charged polymer solution to the substrate surface. The substrate is then rotated to remove excess solution by centrifugal force yielding a thin coating. The coated substrate is then contacted with an oppositely charged solution, and rotated to yield a bilayer of coating. The process can include optional rinsing steps between the polymer coatings and be repeated numerous times to produce a thicker layer-by-layer film. In certain embodiments, the solid electrolytes are formed by spin-assisted layer-by-layer assembly on a sacrificial substrate layer, thereby allowing the formation of free-standing solid electrolytes.

Another embodiment of the coating process involves roll-to-roll layer-by-layer processing techniques. See, for example, US Patent Application Pub. No. 2004/0157047; hereby incorporated by reference in its entirety. Roll-to-roll layer-by-layer processing is a continuous process for manufacturing self-assembled multilayer coatings. A predetermined number of alternating layers of positively charged and negatively charges species are deposited on a moving substrate to form a multilayer composite coating on a substrate in roll form. In certain embodiments, the invention relates to a process for producing a solid electrolyte comprising the steps of: providing an extended length of flexible substrate having upper and lower surface by unwinding an input roll; passing the flexible substrate through a first coating station having a first coating solution, wherein the flexible substrate has a predetermined first immersion time in the first coating solution; optionally passing the flexible substrate through a first rinsing station wherein the flexible substrate is contacted with a suitable solvent; optionally passing the flexible substrate through a first drying station, wherein passing the flexible substrate through the first coating, rinsing and drying stations results in the forming of a first monolayer on at least one surface of the flexible substrate; passing the flexible substrate through a second coating station having a second coating solution, wherein flexible substrate has a predetermined second immersion time in the second coating solution; optionally passing the flexible substrate through a second rinsing station wherein the flexible substrate is contacted with a suitable solvent; and optionally passing the flexible substrate through a second drying station, wherein passing the flexible substrate through the second coating, rinsing and drying stations results in the forming of a second monolayer on at least one surface of the flexible substrate; and repeating the coating, rinsing, drying steps so that a predetermined plurality of alternating monolayers is built up uniformly upon the at least one surface of the flexible substrate to form a solid electrolyte. Each monolayer may comprise a different material, so long as the monolayer has the opposite charge as that of the preceding monolayer and the subsequent monolayer. In certain embodiments, the first coating station and/or the second coating station comprises a dip tank, a sprayer or a roll coater.

In accordance with the present invention, coating solutions can be prepared in a variety of ways. In particular, a coating solution of the present invention can be formed by dissolving a charged polymeric material in water or any other solvent capable of dissolving the materials. When a solvent is used, any solvent that can allow the components within the solution to remain stable in water is suitable. For example, an alcohol-based solvent can be used. Suitable alcohol can include, but are not limited to, isopropyl alcohol, hexanol, ethanol, etc. It should be understood that other solvents commonly used in the art can also be suitably used in the present invention.

Whether dissolved in water or in a solvent, the concentration of a material (i.e., a charged polymeric material) in a solution of the present invention can generally vary depending on the particular materials being utilized, the desired coating thickness, and a number of other factors.

It may be typical to formulate a relatively dilute aqueous solution of charged polymeric material. For example, a charged polymeric material concentration can be between about 0.0001% to about 0.25% by weight, between about 0.005% to about 0.10% by weight, or between about 0.01% to about 0.05% by weight.

In general, the charged polymeric solutions mentioned above can be prepared by any method well known in the art for preparing solutions. Once dissolved, the pH of the solution can also be adjusted by adding a basic or acidic material. For example, a suitable amount of 1 N hydrochloric acid (HCl) can be added to adjust the pH to 2.5.

Where a solid polyelectrolyte comprises at least one bilayer of a first charged polymeric material and a second charged polymeric material having charges opposite of the charges of the first charged polymeric material, it may be desirable to apply a solution containing both the first and second charged polymeric materials within a single solution. For example, a polyanionic solution can be formed as described above, and then mixed with a polycationic solution that is also formed as described above. The solutions can then be mixed slowly to form a coating solution. The amount of each solution applied to the mix depends on the molar charge ratio desired. For example, if a 10:1 (polyanion:polycation) solution is desired, 1 part (by volume) of the polycation solution can be mixed into 10 parts of the polyanion solution. After mixing, the solution can also be filtered if desired.

One aspect of the invention relates to a method of forming a solid electrolyte on a substrate, comprising the steps of:

(a) contacting the substrate with a solution of a first charged polymeric material to form a layer of the charged polymeric material;

(b) optionally rinsing said substrate by contacting said surface with a rinsing solution;

(c) contacting said substrate with a solution of a second charged polymeric material, to form a layer of the second charged polymeric material on top of the layer of the first charged polymeric material, thereby forming a bilayer; and (d) optionally rinsing said substrate by contacting said surface with a rinsing solution;

wherein each bilayer comprises a polycationic layer and a polyanionic layer; the polyanionic layer includes a polymer including an anionic group selected from the group consisting of carboxylate, sulfonate, phosphate, and nitrate; and the anionic group is incorporated in the backbone of the polymer, covalently attached to the backbone of the polymer, or covalently attached to a pendant group of the polymer.

In certain embodiments, the present invention relates to any one of the aforementioned methods, wherein at least one of said contacting occurs by immersion the substrate in a solution.

In certain embodiments, the present invention relates to any one of the aforementioned methods, wherein at least one of said contacting occurs by immersion the substrate in a solution with a pH of between about 1.5 to about 5.5.

In certain embodiments, the present invention relates to any one of the aforementioned methods, wherein at least one of said contacting occurs by immersion the substrate in a solution with a pH of between about 1.5 and about 2.5.

In certain embodiments, the present invention relates to any one of the aforementioned methods, herein at least one of said contacting occurs by immersion the substrate in a solution with a pH of between about 2.5 and about 3.5.

In certain embodiments, the present invention relates to any one of the aforementioned methods, wherein at least one of said contacting occurs by immersion the substrate in a solution with a pH of between about 3.5 about 4.5.

In certain embodiments, the present invention relates to any one of the aforementioned methods, wherein at least one of said contacting occurs by immersion the substrate in a solution with a pH of between about 4.5 about 5.5.

In certain embodiments, the present invention relates to any one of the aforementioned methods, wherein at least one of said contacting occurs by spraying.

In certain embodiments, the present invention relates to any one of the aforementioned methods, wherein the substrate is placed on a spin coater.

In certain embodiments, the present invention relates to any one of the aforementioned methods, wherein at least of one of said contacting occurs onto a moving substrate.

In certain embodiments, the present invention relates to any one of the aforementioned methods, wherein said method further comprises repeating steps (a) through (d) between about 3 times and about 10 times.

In certain embodiments, the present invention relates to any one of the aforementioned methods, wherein said method further comprises repeating steps (a) through (d) between about 10 times and about 30 times.

In certain embodiments, the present invention relates to any one of the aforementioned methods, wherein said method further comprises repeating steps (a) through (d) between about 30 times and about 50 times.

In certain embodiments, the present invention relates to any one of the aforementioned methods, wherein said method further comprises repeating steps (a) through (d) between about 50 times and about 100 times.

In certain embodiments, the present invention relates to any one of the aforementioned methods, wherein said method further comprises repeating steps (a) through (d) between about 100 times and about 200 times.

In certain embodiments, the present invention relates to any one of the aforementioned methods, wherein the solid electrolyte comprises alternating polycationic and polyanionic layers.

In certain embodiments, the present invention relates to any one of the aforementioned methods, wherein at least a portion of the polycationic layers include a polymer selected from the group consisting of linear poly(ethylene imine), poly(diallyl dimethyl ammonium chloride), poly(allylamine hydrochloride), poly(4-vinylpyridine), polysulfones, polyether lactones, and any combination thereof.

In certain embodiments, the present invention relates to any one of the aforementioned methods, wherein at least a portion of the polycationic layers comprise poly(diallyl dimethyl ammonium chloride).

In certain embodiments, the present invention relates to any one of the aforementioned methods, wherein the polyanionic layer includes a polymer including a sulfonate.

In certain embodiments, the present invention relates to any one of the aforementioned methods, wherein the anionic group is covalently attached to the backbone of the polymer.

In certain embodiments, the present invention relates to any one of the aforementioned methods, wherein the polyanionic layer is a monosulfonated poly(1,4-phenylene oxide) which is optionally further substituted an additional one, two or three times with substituents independently selected for each occurrence from the group consisting of halogen, alkyl, aralkyl, alkenyl, alkynyl, cycloalkyl, hydroxyl, alkoxy, aryloxy, amino, nitro, sulfhydryl, imino, amido, carbonyl, carboxyl, silyl, alkylthio, arylthio, heterocyclyl, aryl, heteroaryl, aralkyl, heteroaralkyl, perfluoroalkyl, and cyano.

In certain embodiments, the present invention relates to any one of the aforementioned methods, wherein the polyanionic layer is a monosulfonated poly(2,6-dialkyl 1,4-phenylene oxide).

In certain embodiments, the present invention relates to any one of the aforementioned methods, wherein the polyanionic layer is a monosulfonated poly(2,6-dimethyl 1,4-phenylene oxide).

In certain embodiments, the present invention relates to any one of the aforementioned methods, wherein said monosulfonated poly(1,4-phenylene oxide) is at least about 50% sulfonated.

In certain embodiments, the present invention relates to any one of the aforementioned methods, wherein said monosulfonated poly(1,4-phenylene oxide) is at least about 60% sulfonated.

In certain embodiments, the present invention relates to any one of the aforementioned methods, wherein said monosulfonated poly(1,4-phenylene oxide) is at least about 70% sulfonated.

In certain embodiments, the present invention relates to any one of the aforementioned methods, wherein said monosulfonated poly(1,4-phenylene oxide) is at least about 80% sulfonated.

In certain embodiments, the present invention relates to any one of the aforementioned methods, wherein said monosulfonated poly(1,4-phenylene oxide) is at least about 90% sulfonated.

In certain embodiments, the present invention relates to any one of the aforementioned methods, wherein said monosulfonated poly(1,4-phenylene oxide) is about 100% sulfonated.

In certain embodiments, the present invention relates to any one of the aforementioned methods, wherein within at least one of the polyelectrolyte bilayers, the polycationic layer and the polyanionic layer are covalently cross-linked to one another.

In certain embodiments, the present invention relates to any one of the aforementioned methods, wherein the cross-link is formed by a reaction including one or more of a double bond, carboxyl, thiol, amine, hydroxyl, halogen, carbodiimide, isocyanate, 3-[(2-aminoethyl)dithio]propionic acid, and succinimidyl 4-[N-maleimidomethyl]cyclohexane-1-carboxylate.

In certain embodiments, the present invention relates to any one of the aforementioned methods, wherein about 10% of the polyelectrolyte bilayers are cross-linked.

In certain embodiments, the present invention relates to any one of the aforementioned methods, wherein about 30% of the polyelectrolyte bilayers are cross-linked.

In certain embodiments, the present invention relates to any one of the aforementioned methods, wherein about 50% of the polyelectrolyte bilayers are cross-linked.

In certain embodiments, the present invention relates to any one of the aforementioned methods, wherein about 70% of the polyelectrolyte bilayers are cross-linked.

In certain embodiments, the present invention relates to any one of the aforementioned methods, wherein about 90% of the polyelectrolyte bilayers are cross-linked.

In certain embodiments, the present invention relates to any one of the aforementioned methods, wherein the substrate is non-covalently bound to the polycationic layer or polyanionic layer in an adjacent bilayer.

In certain embodiments, the present invention relates to any one of the aforementioned methods, wherein the substrate comprises a material selected from the group consisting of metals, metal oxides, plastics, ceramics, silicon, glasses, mica, graphite, hydrogels, polymers, and any combination thereof.

In certain embodiments, the present invention relates to any one of the aforementioned methods, wherein the substrate is tetrafluoroethylene-perfluoro-3,6-dioxa-4-methyl-7-octenesulfonic acid copolymer.

In certain embodiments, the present invention relates to any one of the aforementioned methods, wherein the substrate is interposed between two bilayers.

In certain embodiments, the present invention relates to any one of the aforementioned methods, wherein the number of bilayers is about 200.

In certain embodiments, the present invention relates to any one of the aforementioned methods, wherein the number of bilayers is about 150.

In certain embodiments, the present invention relates to any one of the aforementioned methods, wherein the number of bilayers is about 100.

In certain embodiments, the present invention relates to any one of the aforementioned methods, wherein the number of bilayers is about 50.

In certain embodiments, the present invention relates to any one of the aforementioned methods, wherein the number of bilayers is about 30.

In certain embodiments, the present invention relates to any one of the aforementioned methods, wherein the number of bilayers is about 25.

In certain embodiments, the present invention relates to any one of the aforementioned methods, wherein the number of bilayers is about 20.

In certain embodiments, the present invention relates to any one of the aforementioned methods, wherein the number of bilayers is about 15.

In certain embodiments, the present invention relates to any one of the aforementioned methods, wherein the number of bilayers is about 10.

In certain embodiments, the present invention relates to any one of the aforementioned methods, wherein the number of bilayers is about 5.

In certain embodiments, the present invention relates to any one of the aforementioned methods, wherein the number of bilayers is between about 5 and about 100.

In certain embodiments, the present invention relates to any one of the aforementioned methods, wherein the number of bilayers is between about 100 and about 200.

In certain embodiments, the present invention relates to any one of the aforementioned methods, wherein the solid electrolyte has a thickness; and the thickness of the solid electrolyte is about 10 µm thick.

In certain embodiments, the present invention relates to any one of the aforementioned methods, wherein the solid electrolyte has a thickness; and the thickness of the solid electrolyte is about 5 µm thick.

In certain embodiments, the present invention relates to any one of the aforementioned methods, wherein the solid electrolyte has a thickness; and the thickness of the solid electrolyte is about 1 µm thick.

In certain embodiments, the present invention relates to any one of the aforementioned methods, wherein the solid electrolyte has a thickness; and the thickness of the solid electrolyte is about 0.5 µm thick.

In certain embodiments, the present invention relates to any one of the aforementioned methods, wherein the solid electrolyte has a thickness; and the thickness of the solid electrolyte is about 0.3 µm thick.

In certain embodiments, the present invention relates to any one of the aforementioned methods, wherein the solid electrolyte has a thickness; and the thickness of the solid electrolyte is about 0.25 µm thick.

In certain embodiments, the present invention relates to any one of the aforementioned methods, wherein the solid electrolyte has a thickness; and the thickness of the solid electrolyte is about 0.2 µm thick.

In certain embodiments, the present invention relates to any one of the aforementioned methods, wherein the solid electrolyte has a thickness; and the thickness of the solid electrolyte is about 0.15 µm thick.

In certain embodiments, the present invention relates to any one of the aforementioned methods, wherein the solid electrolyte has a thickness; and the thickness of the solid electrolyte is about 0.1 μm thick.

In certain embodiments, the present invention relates to any one of the aforementioned methods, wherein the solid electrolyte has a thickness; and the thickness of the solid electrolyte is about 0.05 μm thick.

In certain embodiments, the present invention relates to any one of the aforementioned methods, wherein the solid electrolyte has a thickness; and the thickness of the solid electrolyte is between about 0.05 μm and 1 μm thick.

In certain embodiments, the present invention relates to any one of the aforementioned methods, wherein the solid electrolyte has a thickness; and the thickness of the solid electrolyte is between about 1 μm and 10 μm thick.

In certain embodiments, the present invention relates to any one of the aforementioned methods, wherein solid electrolyte has an ionic conductivity; and the ionic conductivity of the solid electrolyte is about 10 mS/cm at 100% relative humidity.

In certain embodiments, the present invention relates to any one of the aforementioned methods, wherein solid electrolyte has an ionic conductivity; and the ionic conductivity of the solid electrolyte is about 15 mS/cm at 100% relative humidity.

In certain embodiments, the present invention relates to any one of the aforementioned methods, wherein solid electrolyte has an ionic conductivity; and the ionic conductivity of the solid electrolyte is about 20 mS/cm at 100% relative humidity.

In certain embodiments, the present invention relates to any one of the aforementioned methods, wherein solid electrolyte has an ionic conductivity; and the ionic conductivity of the solid electrolyte is about 25 mS/cm at 100% relative humidity.

In certain embodiments, the present invention relates to any one of the aforementioned methods, wherein solid electrolyte has an ionic conductivity; and the ionic conductivity of the solid electrolyte is about 30 mS/cm at 100% relative humidity.

In certain embodiments, the present invention relates to any one of the aforementioned methods, wherein solid electrolyte has an ionic conductivity; and the ionic conductivity of the solid electrolyte is about 35 mS/cm at 100% relative humidity.

In certain embodiments, the present invention relates to any one of the aforementioned methods, wherein solid electrolyte has an ionic conductivity; and the ionic conductivity of the solid electrolyte is between about 10 mS/cm and about 35 mS/cm at 100% relative humidity.

In certain embodiments, the present invention relates to any one of the aforementioned methods, wherein the solid electrolyte has a methanol permeability; and the methanol permeability of the solid electrolyte is less than about $2.50 \times 10^{10}$ cm$^2$/s.

In certain embodiments, the present invention relates to any one of the aforementioned methods, wherein the solid electrolyte has a methanol permeability; and the methanol permeability of the solid electrolyte is less than about $1.50 \times 10^{10}$ cm$^2$/s.

In certain embodiments, the present invention relates to any one of the aforementioned methods, wherein the solid electrolyte has a methanol permeability; and the methanol permeability of the solid electrolyte is less than about $1.00 \times 10^{10}$ cm$^2$/s.

In certain embodiments, the present invention relates to any one of the aforementioned methods, wherein the solid electrolyte has a methanol permeability; and the methanol permeability of the solid electrolyte is less than about $0.50 \times 10^{10}$ cm$^2$/s.

"Free-Standing" Films

Figure 13:
FIG. 13 shows two images of "free-standing" PDAC/sPPO LBL films (pictures are taken in our laboratory).
Figure 13:
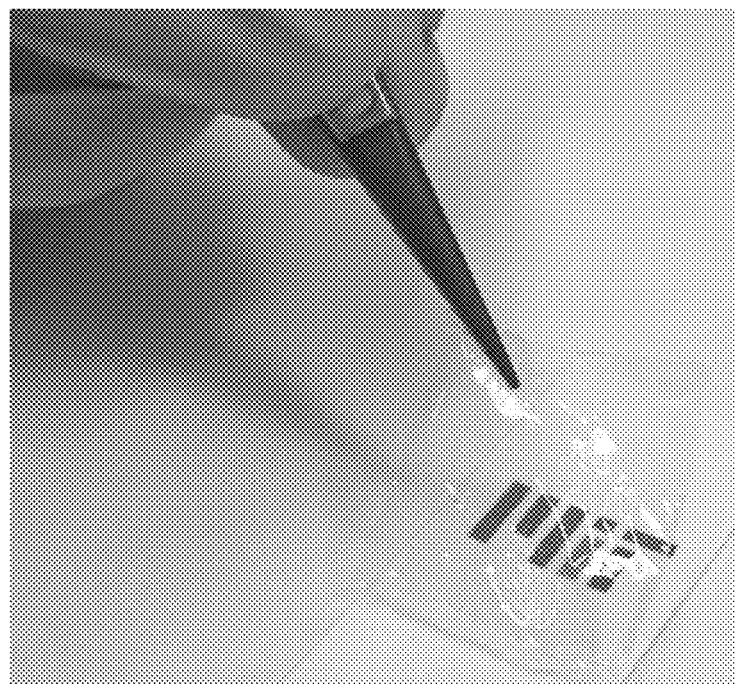

In certain embodiments, the solid electrolyte film can be removed from the substrate. For example, using a spraying technique (e.g., Krogman, Hammond, Zacharia —PCT Publication No. WO/2008/030474, hereby incorporated by reference), but spraying onto a low energy surface (for example, Teflon® or silicon wafers coated with polystyrene), one can peel off the LBL film after assembly to produce "free-standing" LBL films. This allows for elimination of the substrate. Using this approach, one can easily integrate the LBL films into an electrochemical device as the active ion-conducting material. The thickness of these films can be controlled by the number of layers deposited. For example, one spray cycle includes four steps in the following order: (1) PDAC solution; (2) rinse water; (3) sPPO solution; and (4) rinse water. Examples of free-standing films are shown in FIG. 13.

One aspect of the invention relates to a method of forming a free-standing solid electrolyte, comprising the steps of:

(a) contacting a substrate with a solution of a first charged polymeric material to form a layer of the charged polymeric material;

(b) optionally rinsing said substrate by contacting said surface with a rinsing solution;

(c) contacting said substrate with a solution of a second charged polymeric material, to form a layer of the second charged polymeric material on top of the layer of the first charged polymeric material, thereby forming a bilayer;

(d) optionally rinsing said substrate by contacting said surface with a rinsing solution;

(e) optionally repeating steps (a) to (d) at least once to form a solid electrolyte; and (f) removing the solid electrolyte from the substrate; wherein each bilayer comprises a polycationic layer and a polyanionic layer; the polyanionic layer includes a polymer including an anionic group selected from the group consisting of carboxylate, sulfonate, phosphate, and nitrate; and the anionic group is incorporated in the backbone of the polymer, covalently attached to the backbone of the polymer, or covalently attached to a pendant group of the polymer.

In certain embodiments, the present invention relates to any one of the aforementioned methods, wherein at least one of said contacting occurs by immersion the substrate in a solution.

In certain embodiments, the present invention relates to any one of the aforementioned methods, wherein at least one of said contacting occurs by immersion the substrate in a solution with a pH of between about 1.5 to about 5.5.

In certain embodiments, the present invention relates to any one of the aforementioned methods, wherein at least one of said contacting occurs by immersion the substrate in a solution with a pH of between about 1.5 and about 2.5.

In certain embodiments, the present invention relates to any one of the aforementioned methods, herein at least one of said contacting occurs by immersion the substrate in a solution with a pH of between about 2.5 and about 3.5.

In certain embodiments, the present invention relates to any one of the aforementioned methods, wherein at least one of said contacting occurs by immersion the substrate in a solution with a pH of between about 3.5 about 4.5.

In certain embodiments, the present invention relates to any one of the aforementioned methods, wherein at least one of said contacting occurs by immersion the substrate in a solution with a pH of between about 4.5 about 5.5.

In certain embodiments, the present invention relates to any one of the aforementioned methods, wherein at least one of said contacting occurs by spraying.

In certain embodiments, the present invention relates to any one of the aforementioned methods, wherein the substrate is placed on a spin coater.

In certain embodiments, the present invention relates to any one of the aforementioned methods, wherein at least of one of said contacting occurs onto a moving substrate.

In certain embodiments, the present invention relates to any one of the aforementioned methods, wherein said method comprises repeating steps (a) through (d) between about 3 times and about 10 times.

In certain embodiments, the present invention relates to any one of the aforementioned methods, wherein said method comprises repeating steps (a) through (d) between about 10 times and about 30 times.

In certain embodiments, the present invention relates to any one of the aforementioned methods, wherein said method comprises repeating steps (a) through (d) between about 30 times and about 50 times.

In certain embodiments, the present invention relates to any one of the aforementioned methods, wherein said method comprises repeating steps (a) through (d) between about 50 times and about 100 times.

In certain embodiments, the present invention relates to any one of the aforementioned methods, wherein said method comprises repeating steps (a) through (d) between about 100 times and about 200 times.

In certain embodiments, the present invention relates to any one of the aforementioned methods, wherein the solid electrolyte comprises alternating polycationic and polyanionic layers.

In certain embodiments, the present invention relates to any one of the aforementioned methods, wherein at least a portion of the polycationic layers include a polymer selected from the group consisting of linear poly(ethylene imine), poly(diallyl dimethyl ammonium chloride), poly(allylamine hydrochloride), poly(4-vinylpyridine), polysulfones, polyether lactones, and any combination thereof.

In certain embodiments, the present invention relates to any one of the aforementioned methods, wherein at least a portion of the polycationic layers comprise poly(diallyl dimethyl ammonium chloride).

In certain embodiments, the present invention relates to any one of the aforementioned methods, wherein the polyanionic layer includes a polymer including a sulfonate.

In certain embodiments, the present invention relates to any one of the aforementioned methods, wherein the anionic group is covalently attached to the backbone of the polymer.

In certain embodiments, the present invention relates to any one of the aforementioned methods, wherein the polyanionic layer is a monosulfonated poly(1,4-phenylene oxide) which is optionally further substituted an additional one, two or three times with substituents independently selected for each occurrence from the group consisting of halogen, alkyl, aralkyl, alkenyl, alkynyl, cycloalkyl, hydroxyl, alkoxy, aryloxy, amino, nitro, sulfhydryl, imino, amido, carbonyl, carboxyl, silyl, alkylthio, arylthio, heterocyclyl, aryl, heteroaryl, aralkyl, heteroaralkyl, perfluoroalkyl, and cyano.

In certain embodiments, the present invention relates to any one of the aforementioned methods, wherein the polyanionic layer is a monosulfonated poly(2,6-dialkyl 1,4-phenylene oxide).

In certain embodiments, the present invention relates to any one of the aforementioned methods, wherein the polyanionic layer is a monosulfonated poly(2,6-dimethyl 1,4-phenylene oxide).

In certain embodiments, the present invention relates to any one of the aforementioned methods, wherein said monosulfonated poly(1,4-phenylene oxide) is at least about 50% sulfonated.

In certain embodiments, the present invention relates to any one of the aforementioned methods, wherein said monosulfonated poly(1,4-phenylene oxide) is at least about 60% sulfonated.

In certain embodiments, the present invention relates to any one of the aforementioned methods, wherein said monosulfonated poly(1,4-phenylene oxide) is at least about 70% sulfonated.

In certain embodiments, the present invention relates to any one of the aforementioned methods, wherein said monosulfonated poly(1,4-phenylene oxide) is at least about 80% sulfonated.

In certain embodiments, the present invention relates to any one of the aforementioned methods, wherein said monosulfonated poly(1,4-phenylene oxide) is at least about 90% sulfonated.

In certain embodiments, the present invention relates to any one of the aforementioned methods, wherein said monosulfonated poly(1,4-phenylene oxide) is about 100% sulfonated.

In certain embodiments, the present invention relates to any one of the aforementioned methods, wherein within at least one of the polyelectrolyte bilayers, the polycationic layer and the polyanionic layer are covalently cross-linked to one another.

In certain embodiments, the present invention relates to any one of the aforementioned methods, wherein the cross-link is formed by a reaction including one or more of a double bond, carboxyl, thiol, amine, hydroxyl, halogen, carbodiimide, isocyanate, 3-[(2-aminoethyl)dithio]propionic acid, and succinimidyl 4-[N-maleimidomethyl]cyclohexane-1-carboxylate.

In certain embodiments, the present invention relates to any one of the aforementioned methods, wherein about 10% of the polyelectrolyte bilayers are cross-linked.

In certain embodiments, the present invention relates to any one of the aforementioned methods, wherein about 30% of the polyelectrolyte bilayers are cross-linked.

In certain embodiments, the present invention relates to any one of the aforementioned methods, wherein about 50% of the polyelectrolyte bilayers are cross-linked.

In certain embodiments, the present invention relates to any one of the aforementioned methods, wherein about 70% of the polyelectrolyte bilayers are cross-linked.

In certain embodiments, the present invention relates to any one of the aforementioned methods, wherein about 90% of the polyelectrolyte bilayers are cross-linked.

In certain embodiments, the present invention relates to any one of the aforementioned methods, wherein the substrate is non-covalently bound to the polycationic layer or polyanionic layer in an adjacent bilayer.

In certain embodiments, the present invention relates to any one of the aforementioned methods, wherein the substrate is poly(tetrafluoroethylene) or silicon wafers coated with polystyrene.

In certain embodiments, the present invention relates to any one of the aforementioned methods, wherein the number of bilayers is about 200.

In certain embodiments, the present invention relates to any one of the aforementioned methods, wherein the number of bilayers is about 150.

In certain embodiments, the present invention relates to any one of the aforementioned methods, wherein the number of bilayers is about 100.

In certain embodiments, the present invention relates to any one of the aforementioned methods, wherein the number of bilayers is about 50.

In certain embodiments, the present invention relates to any one of the aforementioned methods, wherein the number of bilayers is about 30.

In certain embodiments, the present invention relates to any one of the aforementioned methods, wherein the number of bilayers is about 25.

In certain embodiments, the present invention relates to any one of the aforementioned methods, wherein the number of bilayers is about 20.

In certain embodiments, the present invention relates to any one of the aforementioned methods, wherein the number of bilayers is about 15.

In certain embodiments, the present invention relates to any one of the aforementioned methods, wherein the number of bilayers is about 10.

In certain embodiments, the present invention relates to any one of the aforementioned methods, wherein the number of bilayers is about 5.

In certain embodiments, the present invention relates to any one of the aforementioned methods, wherein the number of bilayers is between about 5 and about 100.

In certain embodiments, the present invention relates to any one of the aforementioned methods, wherein the number of bilayers is between about 100 and about 200.

In certain embodiments, the present invention relates to any one of the aforementioned methods, wherein the solid electrolyte has a thickness; and the thickness of the solid electrolyte is about 10 µm thick.

In certain embodiments, the present invention relates to any one of the aforementioned methods, wherein the solid electrolyte has a thickness; and the thickness of the solid electrolyte is about 5 µm thick.

In certain embodiments, the present invention relates to any one of the aforementioned methods, wherein the solid electrolyte has a thickness; and the thickness of the solid electrolyte is about 1 µm thick.

In certain embodiments, the present invention relates to any one of the aforementioned methods, wherein the solid electrolyte has a thickness; and the thickness of the solid electrolyte is about 0.5 µm thick.

In certain embodiments, the present invention relates to any one of the aforementioned methods, wherein the solid electrolyte has a thickness; and the thickness of the solid electrolyte is about 0.3 µm thick.

In certain embodiments, the present invention relates to any one of the aforementioned methods, wherein the solid electrolyte has a thickness; and the thickness of the solid electrolyte is about 0.25 µm thick.

In certain embodiments, the present invention relates to any one of the aforementioned methods, wherein the solid electrolyte has a thickness; and the thickness of the solid electrolyte is about 0.2 µm thick.

In certain embodiments, the present invention relates to any one of the aforementioned methods, wherein the solid electrolyte has a thickness; and the thickness of the solid electrolyte is about 0.15 µm thick.

In certain embodiments, the present invention relates to any one of the aforementioned methods, wherein the solid electrolyte has a thickness; and the thickness of the solid electrolyte is about 0.1 µm thick.

In certain embodiments, the present invention relates to any one of the aforementioned methods, wherein the solid electrolyte has a thickness; and the thickness of the solid electrolyte is about 0.05 µm thick.

In certain embodiments, the present invention relates to any one of the aforementioned methods, wherein the solid electrolyte has a thickness; and the thickness of the solid electrolyte is between about 0.05 µm and 1 µm thick.

In certain embodiments, the present invention relates to any one of the aforementioned methods, wherein the solid electrolyte has a thickness; and the thickness of the solid electrolyte is between about 1 µm and 10 µm thick.

In certain embodiments, the present invention relates to any one of the aforementioned methods, wherein solid electrolyte has an ionic conductivity; and the ionic conductivity of the solid electrolyte is about 10 mS/cm at 100% relative humidity.

In certain embodiments, the present invention relates to any one of the aforementioned methods, wherein solid electrolyte has an ionic conductivity; and the ionic conductivity of the solid electrolyte is about 15 mS/cm at 100% relative humidity.

In certain embodiments, the present invention relates to any one of the aforementioned methods, wherein solid electrolyte has an ionic conductivity; and the ionic conductivity of the solid electrolyte is about 20 mS/cm at 100% relative humidity.

In certain embodiments, the present invention relates to any one of the aforementioned methods, wherein solid electrolyte has an ionic conductivity; and the ionic conductivity of the solid electrolyte is about 25 mS/cm at 100% relative humidity.

In certain embodiments, the present invention relates to any one of the aforementioned methods, wherein solid electrolyte has an ionic conductivity; and the ionic conductivity of the solid electrolyte is about 30 mS/cm at 100% relative humidity.

In certain embodiments, the present invention relates to any one of the aforementioned methods, wherein solid electrolyte has an ionic conductivity; and the ionic conductivity of the solid electrolyte is about 35 mS/cm at 100% relative humidity.

In certain embodiments, the present invention relates to any one of the aforementioned methods, wherein solid electrolyte has an ionic conductivity; and the ionic conductivity of the solid electrolyte is between about 10 mS/cm and about 35 mS/cm at 100% relative humidity.

In certain embodiments, the present invention relates to any one of the aforementioned methods, wherein the solid electrolyte has a methanol permeability; and the methanol permeability of the solid electrolyte is less than about $2.50 \times 10^{10}$ cm$^2$/s.

In certain embodiments, the present invention relates to any one of the aforementioned methods, wherein the solid electrolyte has a methanol permeability; and the methanol permeability of the solid electrolyte is less than about $1.50 \times 10^{10}$ cm$^2$/s.

In certain embodiments, the present invention relates to any one of the aforementioned methods, wherein the solid electrolyte has a methanol permeability; and the methanol permeability of the solid electrolyte is less than about $1.00 \times 10^{10}$ cm$^2$/s.

In certain embodiments, the present invention relates to any one of the aforementioned methods, wherein the solid electrolyte has a methanol permeability; and the methanol permeability of the solid electrolyte is less than about $0.50 \times 10^{10}$ cm$^2$/s.

Electrochemical Devices

One aspect of the invention relates to an electrochemical device comprising a solid electrolyte; wherein said solid electrolyte comprises:

a plurality of polyelectrolyte bilayers;

wherein each bilayer comprises a polycationic layer and a polyanionic layer; the polycationic layer and the polyanionic layer are non-covalently bound to each other and the polycationic layer or polyanionic layer in an adjacent bilayer; the polyanionic layer includes a polymer including an anionic group selected from the group consisting of carboxylate, sulfonate, phosphate, and nitrate; and the anionic group is incorporated in the backbone of the polymer, covalently attached to the backbone of the polymer, or covalently attached to a pendant group of the polymer.

In certain embodiments, the present invention relates to any one of the aforementioned electrochemical devices, wherein said electrochemical device is selected from the group consisting of proton-exchange membrane fuel cells, solar conversion of water devices, photovoltaic cells, sensors, dye-sensitized photovoltaic cells, light-emitting electrochemical cells, batteries, and electrochromic devices.

In certain embodiments, the present invention relates to any one of the aforementioned electrochemical devices, wherein said electrochemical device is a proton-exchange membrane containing fuel cells.

In certain embodiments, the present invention relates to any one of the aforementioned electrochemical devices, wherein said electrochemical device is a direct-methanol operated fuel cell (DMFC).

In certain embodiments, the present invention relates to any one of the aforementioned electrochemical devices, wherein said solid electrolyte the solid electrolyte comprises alternating polycationic and polyanionic layers.

In certain embodiments, the present invention relates to any one of the aforementioned electrochemical devices, wherein at least a portion of the polycationic layers include a polymer selected from the group consisting of linear poly (ethylene imine), poly(diallyl dimethyl ammonium chloride), poly(allylamine hydrochloride), poly(4-vinylpyridine), polysulfones, polyether lactones, and any combination thereof.

In certain embodiments, the present invention relates to any one of the aforementioned electrochemical devices, wherein at least a portion of the polycationic layers comprise poly(diallyl dimethyl ammonium chloride).

In certain embodiments, the present invention relates to any one of the aforementioned electrochemical devices, wherein the polyanionic layer includes a polymer including a sulfonate.

In certain embodiments, the present invention relates to any one of the aforementioned electrochemical devices, wherein the anionic group is covalently attached to the backbone of the polymer.

In certain embodiments, the present invention relates to any one of the aforementioned electrochemical devices, wherein the polyanionic layer is a monosulfonated poly(1,4-phenylene oxide) which is optionally further substituted an additional one, two or three times with substituents independently selected for each occurrence from the group consisting of halogen, alkyl, aralkyl, alkenyl, alkynyl, cycloalkyl, hydroxyl, alkoxy, aryloxy, amino, nitro, sulfhydryl, imino, amido, carbonyl, carboxyl, silyl, alkylthio, arylthio, heterocyclyl, aryl, heteroaryl, aralkyl, heteroaralkyl, perfluoroalkyl, and cyano.

In certain embodiments, the present invention relates to any one of the aforementioned electrochemical devices, wherein the polyanionic layer is a monosulfonated poly(2,6-dialkyl 1,4-phenylene oxide).

In certain embodiments, the present invention relates to any one of the aforementioned electrochemical devices, wherein the polyanionic layer is a monosulfonated poly(2,6-dimethyl 1,4-phenylene oxide).

In certain embodiments, the present invention relates to any one of the aforementioned electrochemical devices, wherein said monosulfonated poly(1,4-phenylene oxide) is at least about 50% sulfonated.

In certain embodiments, the present invention relates to any one of the aforementioned electrochemical devices, wherein said monosulfonated poly(1,4-phenylene oxide) is at least about 60% sulfonated.

In certain embodiments, the present invention relates to any one of the aforementioned electrochemical devices, wherein said monosulfonated poly(1,4-phenylene oxide) is at least about 70% sulfonated.

In certain embodiments, the present invention relates to any one of the aforementioned electrochemical devices, wherein said monosulfonated poly(1,4-phenylene oxide) is at least about 80% sulfonated.

In certain embodiments, the present invention relates to any one of the aforementioned electrochemical devices, wherein said monosulfonated poly(1,4-phenylene oxide) is at least about 90% sulfonated.

In certain embodiments, the present invention relates to any one of the aforementioned electrochemical devices, wherein said monosulfonated poly(1,4-phenylene oxide) is about 100% sulfonated.

In certain embodiments, the present invention relates to any one of the aforementioned electrochemical devices, wherein within at least one of the polyelectrolyte bilayers, the polycationic layer and the polyanionic layer are covalently cross-linked to one another.

In certain embodiments, the present invention relates to any one of the aforementioned electrochemical devices, wherein the cross-link is formed by a reaction including one or more of a double bond, carboxyl, thiol, amine, hydroxyl, halogen, carbodiimide, isocyanate, 3-[(2-aminoethyl)dithio] propionic acid, and succinimidyl 4-[N-maleimidomethyl]cyclohexane-1-carboxylate.

In certain embodiments, the present invention relates to any one of the aforementioned electrochemical devices, wherein about 10% of the polyelectrolyte bilayers are cross-linked.

In certain embodiments, the present invention relates to any one of the aforementioned electrochemical devices, wherein about 30% of the polyelectrolyte bilayers are cross-linked.

In certain embodiments, the present invention relates to any one of the aforementioned electrochemical devices, wherein about 50% of the polyelectrolyte bilayers are cross-linked.

In certain embodiments, the present invention relates to any one of the aforementioned electrochemical devices, wherein about 70% of the polyelectrolyte bilayers are cross-linked.

In certain embodiments, the present invention relates to any one of the aforementioned electrochemical devices, wherein about 90% of the polyelectrolyte bilayers are cross-linked.

In certain embodiments, the present invention relates to any one of the aforementioned electrochemical devices, further comprising a substrate; wherein the substrate is non-covalently bound to the polycationic layer or polyanionic layer in an adjacent bilayer.

In certain embodiments, the present invention relates to any one of the aforementioned electrochemical devices, wherein the substrate comprises a material selected from the group consisting of metals, metal oxides, plastics, ceramics, silicon, glasses, mica, graphite, hydrogels, polymers, and any combination thereof.

In certain embodiments, the present invention relates to any one of the aforementioned electrochemical devices, wherein the substrate is tetrafluoroethylene-perfluoro-3,6-dioxa-4-methyl-7-octenesulfonic acid copolymer.

In certain embodiments, the present invention relates to any one of the aforementioned electrochemical devices, wherein the substrate interposed between two bilayers.

In certain embodiments, the present invention relates to any one of the aforementioned electrochemical devices, wherein the number of bilayers is about 200.

In certain embodiments, the present invention relates to any one of the aforementioned electrochemical devices, wherein the number of bilayers is about 150.

In certain embodiments, the present invention relates to any one of the aforementioned electrochemical devices, wherein the number of bilayers is about 100.

In certain embodiments, the present invention relates to any one of the aforementioned electrochemical devices, wherein the number of bilayers is about 50.

In certain embodiments, the present invention relates to any one of the aforementioned electrochemical devices, wherein the number of bilayers is about 30.

In certain embodiments, the present invention relates to any one of the aforementioned electrochemical devices, wherein the number of bilayers is about 25.

In certain embodiments, the present invention relates to any one of the aforementioned electrochemical devices, wherein the number of bilayers is about 20.

In certain embodiments, the present invention relates to any one of the aforementioned electrochemical devices, wherein the number of bilayers is about 15.

In certain embodiments, the present invention relates to any one of the aforementioned electrochemical devices, wherein the number of bilayers is about 10.

In certain embodiments, the present invention relates to any one of the aforementioned electrochemical devices, wherein the number of bilayers is about 5.

In certain embodiments, the present invention relates to any one of the aforementioned electrochemical devices, wherein the number of bilayers is between about 5 and about 100.

In certain embodiments, the present invention relates to any one of the aforementioned electrochemical devices, wherein the number of bilayers is between about 100 and about 200.

In certain embodiments, the present invention relates to any one of the aforementioned electrochemical devices, wherein the solid electrolyte has a thickness; and the thickness of the solid electrolyte is about 10 µm thick.

In certain embodiments, the present invention relates to any one of the aforementioned electrochemical devices, wherein the solid electrolyte has a thickness; and the thickness of the solid electrolyte is about 5 µm thick.

In certain embodiments, the present invention relates to any one of the aforementioned electrochemical devices, wherein the solid electrolyte has a thickness; and the thickness of the solid electrolyte is about 1 µm thick.

In certain embodiments, the present invention relates to any one of the aforementioned electrochemical devices, wherein the solid electrolyte has a thickness; and the thickness of the solid electrolyte is about 0.5 µm thick.

In certain embodiments, the present invention relates to any one of the aforementioned electrochemical devices, wherein the solid electrolyte has a thickness; and the thickness of the solid electrolyte is about 0.3 µm thick.

In certain embodiments, the present invention relates to any one of the aforementioned electrochemical devices, wherein the solid electrolyte has a thickness; and the thickness of the solid electrolyte is about 0.25 µm thick.

In certain embodiments, the present invention relates to any one of the aforementioned electrochemical devices, wherein the solid electrolyte has a thickness; and the thickness of the solid electrolyte is about 0.2 µm thick.

In certain embodiments, the present invention relates to any one of the aforementioned electrochemical devices, wherein the solid electrolyte has a thickness; and the thickness of the solid electrolyte is about 0.15 µm thick.

In certain embodiments, the present invention relates to any one of the aforementioned electrochemical devices, wherein the solid electrolyte has a thickness; and the thickness of the solid electrolyte is about 0.1 µm thick.

In certain embodiments, the present invention relates to any one of the aforementioned electrochemical devices, wherein the solid electrolyte has a thickness; and the thickness of the solid electrolyte is about 0.05 µm thick.

In certain embodiments, the present invention relates to any one of the aforementioned electrochemical devices, wherein the solid electrolyte has a thickness; and the thickness of the solid electrolyte is between about 0.05 µm and about 1 µm thick.

In certain embodiments, the present invention relates to any one of the aforementioned electrochemical devices, wherein the solid electrolyte has a thickness; and the thickness of the solid electrolyte is between about 1 µm and about 10 µm thick.

In certain embodiments, the present invention relates to any one of the aforementioned electrochemical devices, wherein solid electrolyte has an ionic conductivity; and the ionic conductivity of the solid electrolyte is about 10 mS/cm at 100% relative humidity.

In certain embodiments, the present invention relates to any one of the aforementioned electrochemical devices, wherein solid electrolyte has an ionic conductivity; and the ionic conductivity of the solid electrolyte is about 15 mS/cm at 100% relative humidity.

In certain embodiments, the present invention relates to any one of the aforementioned electrochemical devices, wherein solid electrolyte has an ionic conductivity; and the ionic conductivity of the solid electrolyte is about 20 mS/cm at 100% relative humidity.

In certain embodiments, the present invention relates to any one of the aforementioned electrochemical devices, wherein solid electrolyte has an ionic conductivity; and the ionic conductivity of the solid electrolyte is about 25 mS/cm at 100% relative humidity.

In certain embodiments, the present invention relates to any one of the aforementioned electrochemical devices, wherein solid electrolyte has an ionic conductivity; and the ionic conductivity of the solid electrolyte is about 30 mS/cm at 100% relative humidity.

In certain embodiments, the present invention relates to any one of the aforementioned electrochemical devices, wherein solid electrolyte has an ionic conductivity; and the ionic conductivity of the solid electrolyte is about 35 mS/cm at 100% relative humidity.

In certain embodiments, the present invention relates to any one of the aforementioned electrochemical devices, wherein solid electrolyte has an ionic conductivity; and the ionic conductivity of the solid electrolyte is between about 10 mS/cm and about 35 mS/cm at 100% relative humidity.

In certain embodiments, the present invention relates to any one of the aforementioned electrochemical devices, wherein the solid electrolyte has a methanol permeability; and the methanol permeability of the solid electrolyte is less than about $2.50 \times 10^{10}$ cm$^2$/s.

In certain embodiments, the present invention relates to any one of the aforementioned electrochemical devices, wherein the solid electrolyte has a methanol permeability; and the methanol permeability of the solid electrolyte is less than about $1.50 \times 10^{10}$ cm$^2$/s.

In certain embodiments, the present invention relates to any one of the aforementioned electrochemical devices, wherein the solid electrolyte has a methanol permeability; and the methanol permeability of the solid electrolyte is less than about $1.00 \times 10^{10}$ cm$^2$/s.

In certain embodiments, the present invention relates to any one of the aforementioned electrochemical devices, wherein the solid electrolyte has a methanol permeability; and the methanol permeability of the solid electrolyte is less than about $0.50 \times 10^{10}$ cm$^2$/s.

In certain embodiments, the present invention relates to any one of the aforementioned electrochemical devices, wherein the solid electrolyte is a free-standing film.

EXEMPLIFICATION

The invention now being generally described, it will be more readily understood by reference to the following examples, which are included merely for purposes of illustration of certain aspects and embodiments of the present invention, and are not intended to limit the invention.

The aromatic polymer of the invention described below is one which is sulfonated to a degree that it is fully water soluble. The sulfonation reaction was carried out in a chlorinated solution using a mild sulfonating agent under inert atmosphere. Using the layer-by-layer assembly method, polymer electrolyte thin films are constructed from the sulfonated polymer (polyanion) and various polycations, examples being linear poly(ethylene imine) (LPEI), poly(diallyldimethylammonium chloride) (PDAC), poly(allylamine hydrochloride) (PAH), and poly(4-vinylpyridine) (P4VP). The assembly conditions, such as pH and ionic strength, of these systems are adjusted to achieve the desired properties of the resulting films. For example, with optimized conditions we attain maximum ionic conductivity values up to 35 mS/cm, which is over 300× times higher than previously reported layer-by-layer films. Also, it was observed low methanol permeability values (which is desirable for methanol fuel cells) of at least 100× lower than current industry standard materials. Further, these films can be deposited on low surface energy substrates and easily removed to produce "free standing" films, which can be directly used in electrochemical devices. Specifics are provided below.

Materials: PPO ($M_w$=23,000), PAH ($M_w$=65,000), P4VP ($M_w$=160,000), 1,2-dichloroethane (DCE), and TMSCS were obtained from Sigma-Aldrich, Inc. LPEI ($M_w$=250,000) and PDAC ($M_w$=240,000) were obtained from Polysciences, Inc. Nafion® 1135 membranes were generously provided by DuPont.

Synthesis of sPPO: PPO was sulfonated in anhydrous DCE at 85° C. for four days using TMSCS as the sulfonating agent (TMSCS:PPO molar ratio is 4:1). Dry nitrogen was bubbled throughout the reaction to remove the hydrochloric acid generated. Highly sulfonated PPO precipitate was filtered, rinsed with chloroform, dissolved in methanol and stirred overnight with 1 molar equivalent of sodium methoxide to deprotect the TMSCS group. The sodium form of sPPO (sPPO-Na) was obtained by precipitation into cold acetone followed by filtration. This polymer was then converted to the protonated form (sPPO—H) by dialyzing against 2% HCl for two days and stored until use. FTIR spectra of both the PPO and sPPO are obtained using Nicolet Magna-IR 550 spectrometer.

Layer-by-Layer Assembly: Dipped film deposition occurred by using a programmable ZEISS DS50 slide stainer. To construct layer-by-layer films, substrates were immersed in a polycation solution (LPEI, PDAC, PAH, or P4VP) for 20 minutes, followed by three two minute rinses in water, and then in sPPO for 20 minutes followed by three two minute rinses in water. The process was repeated numerous times to produce a film of desired thickness.

Sprayed film deposition occurred by using a home built spraying apparatus. To construct layer-by-layer films, substrates were mounted approximately 10 inches from the spray nozzles. The substrate was first sprayed with a polycation solution for 10 seconds, followed by a 10 second rinse, then sprayed with a polyanion solution for 10 seconds, followed by a 10 second rinse. The process was repeated numerous times to produce a film of desired thickness.

Films deposited on glass slides were placed in a conductivity cell with platinum wires as the electrodes, and tested in a humidity and temperature controlled chamber (Electro-tech Systems, Inc.). Through-plane conductivity measurements were performed by depositing 30 bilayers on patterned ITO substrates (Delta Technologies), and gold electrodes were thermally evaporated (Edwards 306, about 100 nm) on the multilayers. The active area was 6 mm$^2$. Ionic conductivity values were determined by impedance spectroscopy with a Solartron 1260 impedance analyzer by sweeping the frequency from 100 kHz down to 10 Hz. Thickness measurements were made by scoring the films with a razor blade and measuring the step change in height between the film and substrate with a Tencor P10 profilometer. The cross-sectional SEM of Nafion® films coated with PDAC/sPPO layers are performed using JEOL 5910 SEM.

Films deposited on low energy surface substrates were dried and gently removed from the substrate to obtain freestanding films.

Methanol Permeation: Methanol permeability values were determined by use of a dual-chamber apparatus, where the membrane separates a methanol solution from a pure water solution. The increase in methanol concentration as a function of time is determined by the changes in the refractive index of the solution.

Membrane Electrode Assembly (MEA) and Fuel Cells: The Nafion® 1135 membrane (89.9 µm dry thickness) was treated with 3M nitric acid for two hours and stored in Milli-Q (Millipore, 18.2 MΩ-cm) water until use. MEAs were made by sandwiching either a Nafion® membrane or a Nafion® membrane coated with an layer-by-layer film between gas-diffusion electrodes obtained from E-Tek Inc. The anode contained unsupported Pt—Ru (1:1) and the cathode contained Pt—C (60% Pt). The loading of Pt or Pt—Ru in the catalyst layer was 4 mg cm$^{-2}$ for both anode and cathode layers. The MEA was hot-pressed at 135° C. and 3500 lbs for 5 minutes and tested using DMFC hardware obtained from Fuel Cell Technologies, Inc. Methanol was fed to the anode at a flow rate of 4 mL min⁻¹ using a peristaltic pump and humidified air was supplied to the cathode at 60 mL min⁻¹. Polarization curves were generated from a Gamry PCI750 potentiostat connected to the DMFC hardware.

INCORPORATION BY REFERENCE

All of the U.S. patents and U.S. patent application publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A solid electrolyte, comprising:
a plurality of polyelectrolyte bilayers;
wherein each bilayer comprises a polycationic layer and a polyanionic layer; the polycationic layer and the polyanionic layer of each bilayer are non-covalently bound to each other; each polycationic layer that is adjacent to another bilayer is non-covalently bound to the polyanionic layer of the adjacent bilayer; and the polyanionic layer consists of a monosulfonated poly(1,4-phenylene oxide) which is optionally further substituted an additional one, two or three times with substituents selected independently for each occurrence from the group consisting of halogen, alkyl, aralkyl, alkenyl, alkynyl, cycloalkyl, hydroxyl, alkoxy, aryloxy, amino, nitro, sulfhydryl, imino, amido, carbonyl, carboxyl, silyl, alkylthio, arylthio, heterocyclyl, aryl, heteroaryl, aralkyl, heteroaralkyl, perfluoroalkyl, and cyano.

2. The solid electrolyte of claim 1, wherein the solid electrolyte comprises alternating polycationic and polyanionic layers.

3. The solid electrolyte of claim 1, wherein at least one of the polycationic layers comprises a polymer selected from the group consisting of linear poly(ethylene imine), poly(diallyl dimethyl ammonium chloride), poly(allylamine hydrochloride), poly(4-vinylpyridine), polysulfones, polyether lactones, and any combination thereof.

4. The solid electrolyte of claim 1, wherein at least one of the polycationic layers comprises poly(diallyl dimethyl ammonium chloride).

5. The solid electrolyte of claim 1, wherein the polyanionic layer is a monosulfonated poly(2,6-dialkyl 1,4-phenylene oxide).

6. The solid electrolyte of claim 5, wherein said monosulfonated poly(2,6-dialkyl 1,4-phenylene oxide) is at least about 50% sulfonated.

7. The solid electrolyte of claim 1, wherein the polyanionic layer is a monosulfonated poly(2,6-dimethyl 1,4-phenylene oxide).

8. The solid electrolyte of claim 7, wherein said monosulfonated poly(2,6-dimethyl 1,4-phenylene oxide) is at least about 50% sulfonated.

9. The solid electrolyte of claim 1, wherein said monosulfonated poly(1,4-phenylene oxide) is at least about 50% sulfonated.

10. The solid electrolyte of claim 1, further comprising a substrate; wherein the substrate is non-covalently bound to the polycationic layer or polyanionic layer in an adjacent bilayer.

11. The solid electrolyte of claim 10, wherein the substrate comprises a material selected from the group consisting of metals, metal oxides, plastics, ceramics, silicon, glasses, mica, graphite, hydrogels, polymers, and any combination thereof.

12. The solid electrolyte of claim 10, wherein the substrate is tetrafluoroethylene-perfluoro-3,6-dioxa-4-methyl-7-octenesulfonic acid copolymer.

13. The solid electrolyte of claim 10, wherein the substrate is interposed between two bilayers.

14. An electrochemical device comprising a solid electrolyte;
wherein said solid electrolyte comprises:
a plurality of polyelectrolyte bilayers;
wherein each bilayer comprises a polycationic layer and a polyanionic layer; the polycationic layer and the polyanionic layer of each bilayer are non-covalently bound to each other; each polycationic layer that is adjacent to another bilayer is non-covalently bound to the polyanionic layer of the adjacent bilayer; and the polyanionic layer consists of a monosulfonated poly(1,4-phenylene oxide) which is optionally further substituted an additional one, two or three times with substituents selected independently for each occurrence from the group consisting of halogen, alkyl, aralkyl, alkenyl, alkynyl, cycloalkyl, hydroxyl, alkoxy, aryloxy, amino, nitro, sulfhydryl, imino, amido, carbonyl, carboxyl, silyl, alkylthio, arylthio, heterocyclyl, aryl, heteroaryl, aralkyl, heteroaralkyl, perfluoroalkyl, and cyano.

* * * * *